(12) United States Patent
Shin

(10) Patent No.: US 7,738,512 B2
(45) Date of Patent: Jun. 15, 2010

(54) DISPLAY DEVICE USING DEMULTIPLEXER

(75) Inventor: Dong-Yong Shin, Suwon-si (KR)

(73) Assignee: Samsung Mobile Display Co., Ltd., Yongin (KR)

(*) Notice: Subject to any disclaimer, the term of this patent is extended or adjusted under 35 U.S.C. 154(b) by 929 days.

(21) Appl. No.: 10/990,659

(22) Filed: Nov. 16, 2004

(65) Prior Publication Data

US 2005/0117611 A1 Jun. 2, 2005

(30) Foreign Application Priority Data

Nov. 27, 2003 (KR) .................. 10-2003-0085079

(51) Int. Cl.
H04J 3/04 (2006.01)
(52) U.S. Cl. .............. 370/536; 370/542; 370/543; 345/76; 345/77; 345/82; 345/98; 345/690
(58) Field of Classification Search ............... 345/76, 345/77, 82, 690, 98; 370/536, 542, 543
See application file for complete search history.

(56) References Cited

U.S. PATENT DOCUMENTS

| | | | |
|---|---|---|---|
| 4,447,812 A | 5/1984 | Soneda et al. | |
| 5,426,447 A * | 6/1995 | Lee | .................. 345/103 |
| 5,510,807 A | 4/1996 | Lee et al. | |
| 5,555,001 A | 9/1996 | Lee et al. | |
| 5,633,653 A | 5/1997 | Atherton | |
| 5,708,454 A | 1/1998 | Katoh et al. | |
| 5,892,493 A | 4/1999 | Enami et al. | |
| 6,097,362 A | 8/2000 | Kim | |
| 6,333,729 B1 | 12/2001 | Ha | |
| 6,348,906 B1 | 2/2002 | Dawson et al. | |
| 6,359,608 B1 * | 3/2002 | Lebrun et al. | ............... 345/100 |
| 6,559,836 B1 | 5/2003 | Mori | |

(Continued)

FOREIGN PATENT DOCUMENTS

CN 1116454 A 2/1996

(Continued)

OTHER PUBLICATIONS

Patent Abstracts of Japan, Publication No. 2000-122607, dated Apr. 28, 2000, in the name of Norio Ozawa.

(Continued)

*Primary Examiner*—William Trost, IV
*Assistant Examiner*—Toan D Nguyen
(74) *Attorney, Agent, or Firm*—Christie, Parker & Hale, LLP

(57) ABSTRACT

Disclosed is a display device using a demultiplexer. The demultiplexer sequentially samples the data current that is time-divided and applied by a data driver, and holds it to the data lines. Since the demultiplexer is to sample the data currents corresponding to N data lines during one horizontal period when performing 1:N demultiplexing, the data current corresponding to one data line is sampled during the 1/N horizontal period. In the present invention, a signal line coupled between the demultiplexer and the data driver is precharged with the current before coupling a precharge circuit to a sample/hold circuit and sampling the data current. The precharge current is M times the data current where M is a real number greater than 1.

26 Claims, 19 Drawing Sheets

U.S. PATENT DOCUMENTS

| | | | |
|---|---|---|---|
| 6,667,580 | B2 | 12/2003 | Kim et al. |
| 6,731,266 | B1 | 5/2004 | Jung |
| 6,771,028 | B1 | 8/2004 | Winters |
| 6,924,784 | B1* | 8/2005 | Yeo et al. ............... 345/98 |
| 7,015,882 | B2 | 3/2006 | Yumoto |
| 7,038,652 | B2 | 5/2006 | Kang et al. |
| 7,180,497 | B2* | 2/2007 | Lee et al. ............... 345/98 |
| 7,193,619 | B2 | 3/2007 | Kimura |
| 7,253,665 | B2 | 8/2007 | Kimura |
| 7,256,756 | B2 | 8/2007 | Abe |
| 7,259,740 | B2* | 8/2007 | Haga et al. ............... 345/98 |
| 7,310,092 | B2 | 12/2007 | Imamura |
| 7,324,079 | B2 | 1/2008 | Tobita |
| 7,342,559 | B2 | 3/2008 | Shin |
| 7,403,176 | B2 | 7/2008 | Chung et al. |
| 7,468,718 | B2 | 12/2008 | Shin |
| 7,505,017 | B1 | 3/2009 | Yeo et al. |
| 2003/0030602 | A1* | 2/2003 | Kasai ............... 345/76 |
| 2003/0107561 | A1 | 6/2003 | Uchino et al. |
| 2003/0132907 | A1 | 7/2003 | Lee et al. |
| 2003/0179164 | A1 | 9/2003 | Shin et al. |
| 2004/0032382 | A1 | 2/2004 | Cok et al. |
| 2004/0056852 | A1 | 3/2004 | Shih et al. |
| 2004/0227749 | A1* | 11/2004 | Kimura ............... 345/211 |
| 2005/0110727 | A1 | 5/2005 | Shin |

FOREIGN PATENT DOCUMENTS

| | | |
|---|---|---|
| CN | 1301377 A | 6/2001 |
| CN | 1417771 A | 5/2003 |
| CN | 1432989 A | 7/2003 |
| CN | 1447302 A | 10/2003 |
| CN | 1488131 | 4/2004 |
| GB | 2 384 102 A | 7/2003 |
| JP | 02-306293 | 12/1990 |
| JP | 06-118913 | 4/1994 |
| JP | 2000-122607 | 4/2000 |
| JP | 2000-356978 | 12/2000 |
| JP | 2002-40961 | 2/2002 |
| JP | 2002-351357 | 12/2002 |
| JP | 2003-058108 | 2/2003 |
| JP | 2003-76327 | 3/2003 |
| JP | 2003-114645 | 4/2003 |
| JP | 2003-157048 | 5/2003 |
| JP | 2003-177722 | 6/2003 |
| JP | 2003-195812 | 7/2003 |
| JP | 2003-195815 | 7/2003 |
| JP | 2003-330386 | 11/2003 |
| JP | 2004-029528 | 1/2004 |
| JP | 2004-29755 | 1/2004 |
| JP | 2004-145224 | 5/2004 |
| JP | 2005-70227 | 3/2005 |
| KR | 2003-0075946 | 9/2003 |
| WO | WO 02/39420 A1 | 5/2002 |
| WO | WO 03/038796 A1 | 5/2003 |
| WO | WO 03/038797 | 5/2003 |
| WO | WO 03/091980 A1 | 11/2003 |
| WO | WO 2004/077671 A1 | 9/2004 |

OTHER PUBLICATIONS

Patent Abstracts of Japan, Publication No. 2003-076327, dated Mar. 13, 2003, in the name of Koichi Iguchi.
Patent Abstracts of Japan, Publication No. 2003-114645, dated Apr. 18, 2003, in the name of Toshiyuki Kasai.
Patent Abstracts of Japan, Publication No. 2003-195812, dated Jul. 9, 2003, in the name of Katsumi Abe.
Patent Abstracts of Japan, Publication No. 2003-195815, dated Jul. 9, 2003, in the name of Akira Yumoto.
Patent Abstracts of Japan, Publication No. 2003-330386, dated Nov. 19, 2003, in the name of Hajime Akimoto et al.
Patent Abstracts of Japan, Publication No. 2005-070227, dated Mar. 17, 2005, in the name of Norio Ozawa.
Patent Abstracts of Japan, Publication No. 2000-356978, dated Dec. 26, 2000, in the name of Ju Cheon Yeo et al.
Office action dated Jan. 11, 2008 for related U.S. Appl. No. 10/992,327, citing 5,555,001.
Chinese Office action for corresponding China Patent Application 2005100738191, indicating relevance of CN 1447302 and JP 2004-29755 listed in this IDS.
Patent abstract of Japan for publication No. 2002-040961, dated Feb. 8, 2002 in the name of Yoshiharu Hashimoto.
Patent Abstract of Japan, Publication No. 2004-029755, dated Jan. 29, 2004, in the name of Hiroshi Takahara.
Korean Patent Abstracts, Publication No. 1020030075946, dated Sep. 26, 2003, in the name of O Gyeong Kwon et al.
English Abstract of China Patent Gazette for China patent 100409282C, listing China references in noted in this IDS (except CN 1432989 A).
China Office action dated Jun. 8, 2007, for CN 200510070218.5, and English translation.
U.S. Office action dated Aug. 12, 2008, for related U.S. Appl. No. 11/112,835, indicating relevance of U.S. references listed in this IDS.
U.S. Office action dated Aug. 13, 2008, for related U.S. Appl. No. 10/992,327, indicating relevance of U.S. references listed in this IDS.
U.S. Office action dated Sep. 30, 2008, for related U.S. Appl. No. 11/124,926, indicating relevance of U.S. references 6,771,028 and Japan Publication 2003-157048 listed in this IDS.
T. Kretz et al; "A 3.4-inch Reflective Colour Active Matrix Liquid Crystal Display without Polarisers"; SID 02 Digest, May 2002, pp. 798-801.
M. Ohta et al; "A Novel Current Programmed Pixel for Active Matrix OLED Displays"; SID 03 Digest, May 20, 2003, pp. 108-111.
European Search Report, dated Sep. 22, 2005, for Application No. 05103845.3-2205, in the name of Samsung SDI Co., Ltd.
European Search Report dated Apr. 2, 2008, for European application 05103845.3, indicating relevance of U.S. Patent 6,559,836 listed in this IDS.
U.S. Notice of Allowance dated Dec. 2, 2008, for related U.S. Appl. No. 10/997,486, noting listed reference in this IDS.
SIPO Patent Gazette, dated Oct. 8, 2008, for Chinese application 200510073819.1, noting references listed in this IDS.
U.S. Office action dated Feb. 18, 2009, for related U.S. Appl. No. 11/124,926, noting listed references in this IDS.
Japanese Office action dated Oct. 6, 2009, for corresponding Japanese application 2004-336903, noting listed International publication in this IDS.
U.S. Office action dated Jun. 2, 2009, for related U.S. Appl. No. 11/124,926, noting U.S. Publication 2005/0110727 listed in this IDS.
U.S. Notice of Allowance dated Jul. 9, 2009, for related U.S. Appl. No. 10/992,327, noting U.S. Patents listed in this IDS.
U.S. Notice of Allowance, dated Apr. 15, 2009, for related U.S. Appl. No. 10/997,486, noting listed reference in this IDS.

* cited by examiner

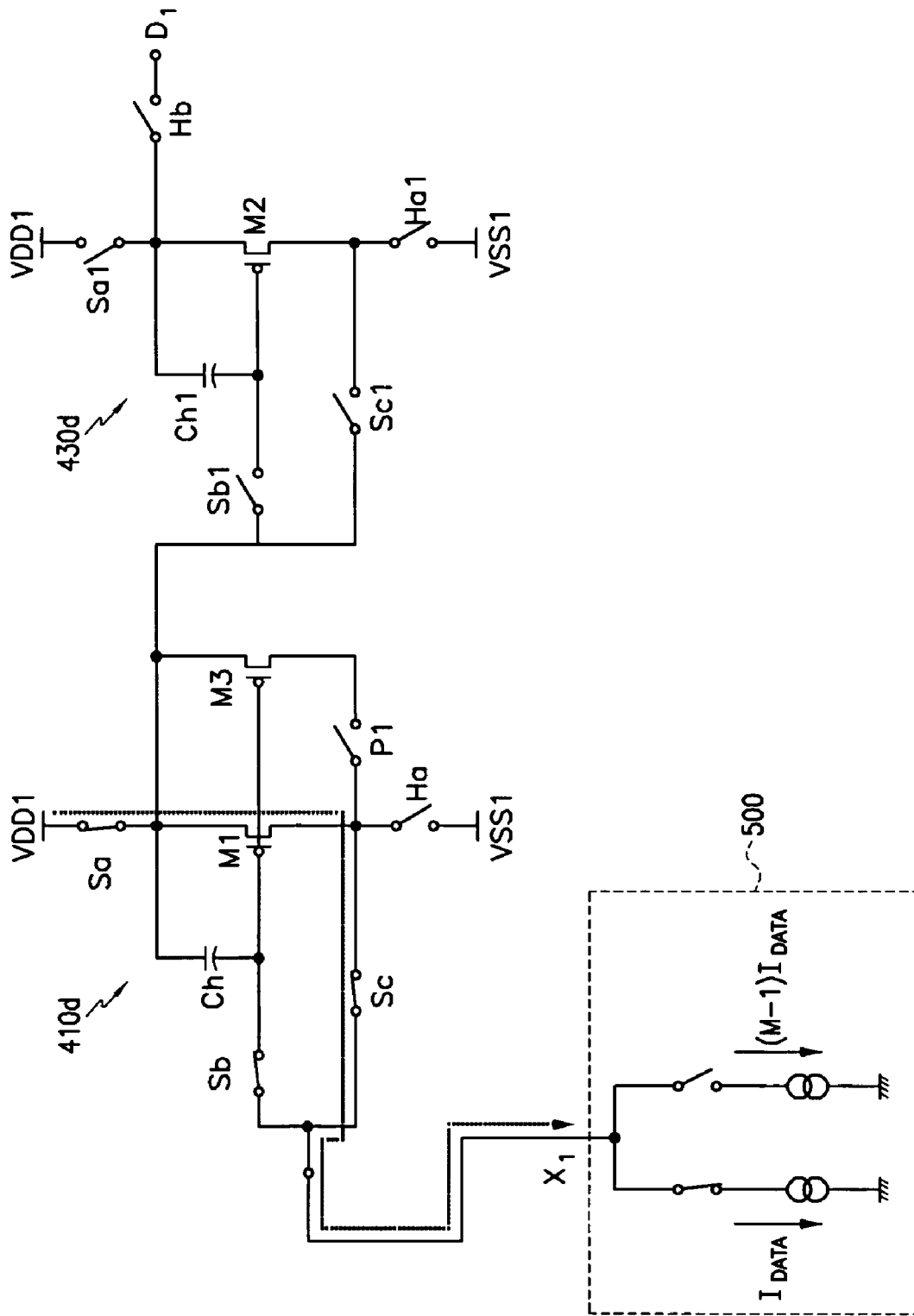

DISPLAY DEVICE USING DEMULTIPLEXER

CROSS REFERENCE TO RELATED APPLICATION

This application claims priority to and the benefit of Korean Patent Application No. 10-2003-0085079 filed on Nov. 27, 2003 in the Korean Intellectual Property Office, the entire content of which is incorporated herein by reference.

BACKGROUND OF THE INVENTION (a) Field of the Invention

The present invention relates to a display device using a demultiplexer. More specifically, the present invention relates to a display device for performing demultiplexing via a sample/hold circuit.

(b) Description of the Related Art

A display device generally requires a scan driver for driving scan lines and a data driver for driving data lines. The data driver has as many output terminals as it has data lines to convert digital data signals into analog signals and apply them to all of the data lines. In general, the data driver is configured with a plurality of integrated circuits (ICs). The plurality of ICs are used to drive all of the data lines given that a single IC is limited in the number of output terminals it contains. Demultiplexers may be adopted, however, to reduce the number of data driver ICs.

For example, a 1:2 demultiplexer receives data signals that are time-divided and applied by the data driver through a signal line. The demultiplexer divides the data signals into two data groups and outputs them to two data lines. Therefore, usage of a 1:2 demultiplexer reduces the number of data driver ICs by half. The recent trend with liquid crystal displays (LCDs) and organic electroluminescent displays is to mount the ICs for the data driver on the panel. In this instance, there is a greater need to reduce the number of data driver ICs.

Under current technology, when the IC for the demultiplexer, the data driver, and the scan driver is manufactured to be directly mounted on the panel, power supply points, power supply lines, and power wiring are formed as shown in FIG. 1 to supply power to the pixels.

Referring to FIG. 1, a left scan driver 20 is provided on a display area 10 for applying select signals to select scan lines $SE_1$ to $SE_m$, and a right scan driver 30 is provided on the display area for applying signals for controlling light emission to emit scan lines $EM_1$ to $EM_m$. A demultiplexer unit 40 and a data driver 50 are also provided on the display area for applying data signals to data lines $D_1$ to $D_m$. In this instance, vertical lines 60 are formed for supplying power supply voltages to the respective pixels, and a power line 70 coupled to each vertical line 60 on the top of the substrate is formed in the horizontal direction. Power line 70 and an external power supply line 80 surrounding scan drivers 20, 30 are coupled through a power supply point 90.

In this instance, since the current flows through power line 70 and vertical line 60 when a power supply voltage is used in the pixels, a voltage drop (i.e., an IR drop) is generated in power line 70 and vertical line 60 because of parasitic resistance in power line 70 and vertical line 60. The further along power line 70 and vertical line 60 from power supply point 90, the greater the voltage drop that is generated, the generated voltage drop being the greatest near the center of power line 70 and near the bottom of vertical line 60.

In general, since the pixels have characteristic deviations of driving transistors, it is generally required to obtain a margin of the saturation area in the characteristic curve of the driving transistors. However, when a great voltage drop is generated, power consumption is increased due to a general need to enlarge the power supply voltage to obtain a sufficient margin of the saturation area. Also, when sample/hold circuits are used for 1:N demultiplexing in the demultiplexer, it is generally required to sample the data current which corresponds to a data line during a 1/N time of a particular horizontal period, shortening the sampling time, and hindering an appropriate sampling of the data current.

SUMMARY OF THE INVENTION

According to one embodiment, the present invention provides a display device using a demultiplexer for reducing a voltage drop.

According to another embodiment, the present invention provides a display device for performing sampling within a given time.

In accordance with an exemplary embodiment of the present invention, a signal line between a demultiplexer and a data driver is precharged with current before data is sampled in the demultiplexer.

According to one embodiment, the present invention is directed to a display device including: a display area including a plurality of data lines for transmitting data current for displaying an image, and a plurality of pixel circuits coupled to the data lines; a plurality of first signal lines; a data driver coupled to the first signal lines for time-dividing a first current corresponding to the data current, and transmitting the time-divided first current to the first signal lines; and a demultiplexer unit including a plurality of demultiplexers for respectively receiving the first current from the first signal lines, and a precharge unit coupled to the demultiplexer for transmitting a precharge current corresponding to the first current to the first signal lines in response to a control signal, wherein the demultiplexer receives the first current from the first signal lines and transmits the data current to at least two data lines, and the precharge current is transmitted to the first signal lines before the data driver transmits the first current corresponding to one of the data lines.

The demultiplexer includes a plurality of sample/hold circuits coupled to the first signal lines, and sample/hold circuits of first group from the plurality of sample/hold circuits hold current sampled during a previous horizontal period to at least two data lines and sample/hold circuits of a second group sequentially sample the first current sequentially applied through the first signal line during a particular horizontal period.

According to one embodiment, the sample/hold circuits include first and second sample/hold circuits having input terminals coupled to the first signal lines and output terminals coupled to a first data line of the at least two data lines; and third and fourth sample/hold circuits having input terminals coupled to the first signal lines and output terminals coupled to a second data line of the at least two data lines, wherein the first and third sample/hold circuits form the first group of sample/hold circuits, and the second and fourth sample/hold circuits form the second group of sample/hold circuits.

The demultiplexer includes a plurality of sample/hold circuits coupled to the first signal lines, the sample/hold circuits of a first group sequentially sample the first current sequentially applied through the first signal lines, and the sample/hold circuits of a second group hold sampled current to at least two data lines during a first period of a horizontal period. The sample/hold circuits of the first group performs holding, and the sample/hold circuits of the second group sample the current held by the sample/hold circuits of the first group during a second portion of the horizontal period.

According to one embodiment, the second period is shorter than the first period.

The sample/hold circuits of the first group include first and second sample/hold circuits having input terminals coupled to the first signal lines, and the sample/hold circuits of the second group include third and fourth sample/hold circuits having input terminals coupled to output terminals of the first and second sample/hold circuits, and having output terminals coupled to first and second data lines of the at least two data lines.

The sample/hold circuit includes a sampling switch being turned on in response to a sampling signal, a holding switch being turned on in response to a holding signal, and a data storage element for sampling the current applied through the input terminal when the sampling switch is turned on and holding the sampled current when the holding switch is turned on.

The data storage element includes: a first transistor having a source coupled to a first power source and a gate and a drain coupled to the first signal line in response to the sampling signal; and a capacitor coupled between the gate and the source of the first transistor for storing a voltage corresponding to the current transmitted to the drain.

The precharge unit includes at least one precharge circuit coupled to at least one sample/hold circuit having an input terminal coupled to the first signal line. The precharge circuit includes a second transistor having a source, a gate, and a drain respectively coupled to the source, the gate, and the drain of the first transistor when the control signal is applied.

The sampling signal is applied substantially concurrently with the control signal, and the control signal is intercepted while the sampling signal is applied. According to one embodiment, the precharge current is about M times the first current, where M is a real number greater than 1, and a value obtained from a ratio of (channel width)/(channel length) of the second transistor is about (M−1) times a value obtained from a ratio of (channel width)/(channel length) of the first transistor.

The precharge circuit further includes a switch coupled between the drain of the first transistor and the drain of the second transistor, and it is turned on in response to the control signal.

The sampling switch includes a first switch coupled between the drain of the first transistor and the input terminal, a second switch for diode-connecting the first transistor when it is turned on, and a third switch coupled between the first power source and the first transistor. The holding switch includes a fourth switch coupled between a second power source and the first transistor, and a fifth switch coupled between the first transistor and an output terminal.

The display area further includes a plurality of second signal lines for supplying a power supply voltage to the pixel circuit. The display device further includes a power line, formed between the demultiplexer unit and the data driver, insulated from the first signal line and crossing the first signal line, for transmitting the power supply voltage provided from the second signal line.

The pixel circuit comprises: a transistor to which the data current transmitted through the data line flows; a capacitor, coupled between the source and the gate of the transistor, for storing a voltage corresponding to the current flowing to the transistor; and a light emitting element for emitting light in correspondence to the current flowing to the transistor according to the voltage stored in the capacitor.

According to one embodiment, the light emitting element uses electroluminescent light emission of organic matter.

According to another embodiment, the present invention is directed to a display device including: a display area including first and second data lines extended in one direction, and a plurality of pixel circuits coupled to the first and second data lines; a first signal line; a first sample/hold circuit coupled between the first signal line and the first data line for holding a first data current for displaying an image, to the first data line; a second sample/hold circuit coupled between the first signal line and the second data line for holding a second data current for displaying an image, to the second data line; a data driver coupled to the first signal line for sequentially transmitting first and second currents respectively corresponding to first and second data currents to the first signal line; a first precharge circuit coupled to the first sample/hold circuit for transmitting a first precharge current to the first signal line before the first current is applied to the first signal line; and a second precharge circuit coupled to the second sample/hold circuit for transmitting a second precharge current to the first signal line before the second current is applied to the first signal line. The first and second sample/hold circuits respectively sample the first and second currents during one horizontal period and hold the first and second currents during the subsequent horizontal period.

In still another aspect of the present invention, a display device includes: a display area including first and second data lines extended in one direction and a plurality of pixel circuits coupled to the first and second data lines; a first signal line; a first sample/hold circuit having an input terminal coupled to the first signal line; a second sample/hold circuit having an input terminal coupled to the first signal line; a third sample/hold circuit, coupled between an output terminal of the first sample/hold circuit and the first data line, for holding a first data current for displaying an image, to the first data line; a fourth sample/hold circuit coupled between an output terminal of the second sample/hold circuit and the second data line for holding a second data current for displaying an image, to the second data line; a data driver coupled to the first signal line for sequentially transmitting first and second currents respectively corresponding to first and second data currents to the first signal line; a first precharge circuit coupled to the first sample/hold circuit for transmitting a first precharge current to the first signal line before the first current is applied to the first signal line; and a second precharge circuit coupled to the second sample/hold circuit for transmitting a second precharge current to the first signal line before the second current is applied to the first signal line. The first and second sample/hold circuits respectively sample the first and second currents during a first portion of a horizontal period and hold the sampled currents during a second portion of the horizontal period, and the third and fourth sample/hold circuits sample the currents held by the first and second sample/hold circuits during the second portion and hold the first and second data currents during the first portion.

In still yet another embodiment, the present invention is directed to a display device including a plurality of data lines for transmitting data current for displaying images, a plurality of pixel circuits coupled to the data lines for displaying the images according to the data currents, and a plurality of first signal lines corresponding to at least two data lines from among the data lines and sequentially transmitting currents corresponding to the data currents. The display device includes: a data driver for time-dividing the currents corresponding to at least two data lines and applying them to the first signal lines; a first sample/hold circuit for sampling a first current corresponding to one of data lines that is time-divided and applied through the first signal lines, the first sample/hold circuit including a first transistor and a capacitor coupled to a source and a gate of the first transistor; and a precharge circuit coupled to the first sample/hold circuit, the precharge circuit including a second transistor. The first current is applied to the first signal line while at least one of sources, gates, and drains of the first and second transistors are decoupled, after a precharge current corresponding to the first current is applied to the first signal line while the sources, the gates, and the drains of the first and second transistors are coupled.

According to another embodiment, the present invention is directed to a display device including a display area with a plurality of data lines for transmitting data current for displaying an image, and a plurality of pixel circuits coupled to the data lines. The display device further includes a plurality of first signal lines and a data driver coupled to the plurality of first signal lines. The data driver time-divides a first current corresponding to the data current and transmits the time-divided first current to the plurality of first signal lines. The display device also includes a demultiplexer unit having a plurality of demultiplexers and a precharge unit coupled to at least one of the demultiplexers. The precharge unit transmits a precharge current to at least one of the first signal lines in response to a control signal before the data driver transmits the first current via one of the first signal lines. According to one embodiment, the precharge current is about M times larger than the first data current where M is a real number greater than 1. One of the demultiplexers receives the first current transmitted by the data driver via the one of the first signal lines and transmits the first current to at least two data lines.

BRIEF DESCRIPTION OF THE DRAWINGS

FIGS. 20A and 20B respectively show a precharge method according to a fifth exemplary embodiment of the present invention.

DETAILED DESCRIPTION

Figure 1:
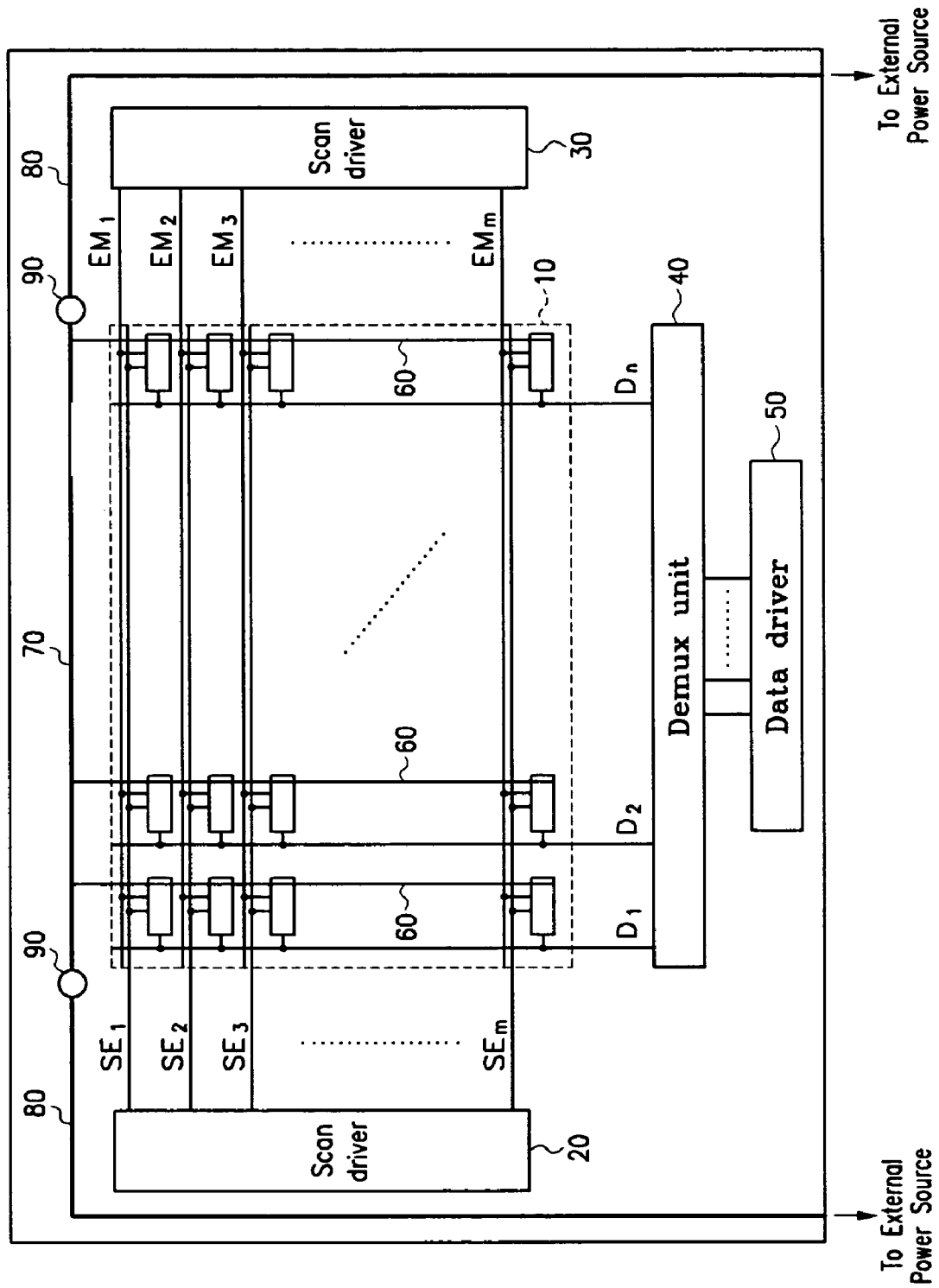
FIG. 1 shows a simplified view of a conventional display device using a demultiplexer.
Figure 2:
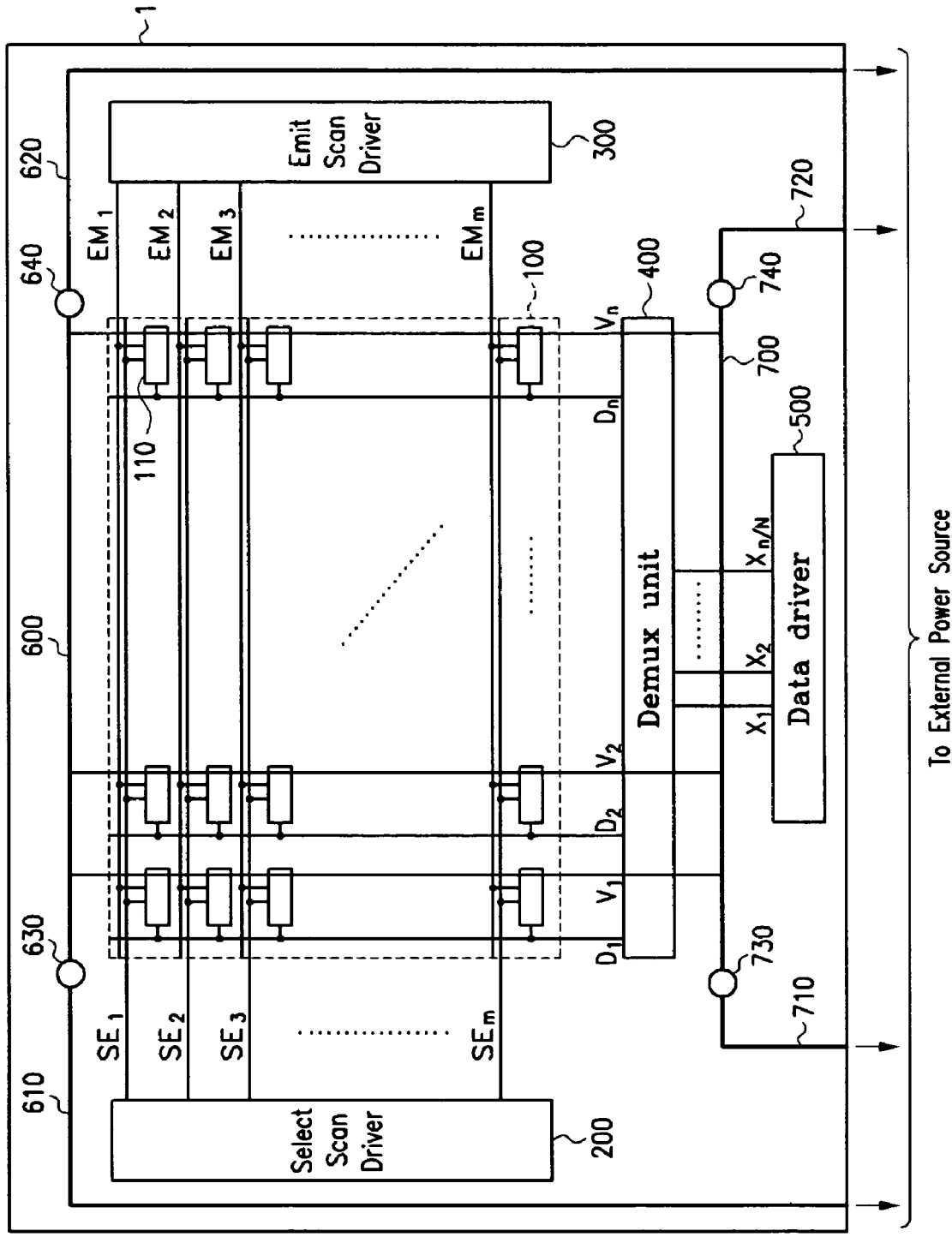
FIG. 2 shows a simplified view of a display device using a demultiplexer according to a first exemplary embodiment of the present invention.
Figure 3:
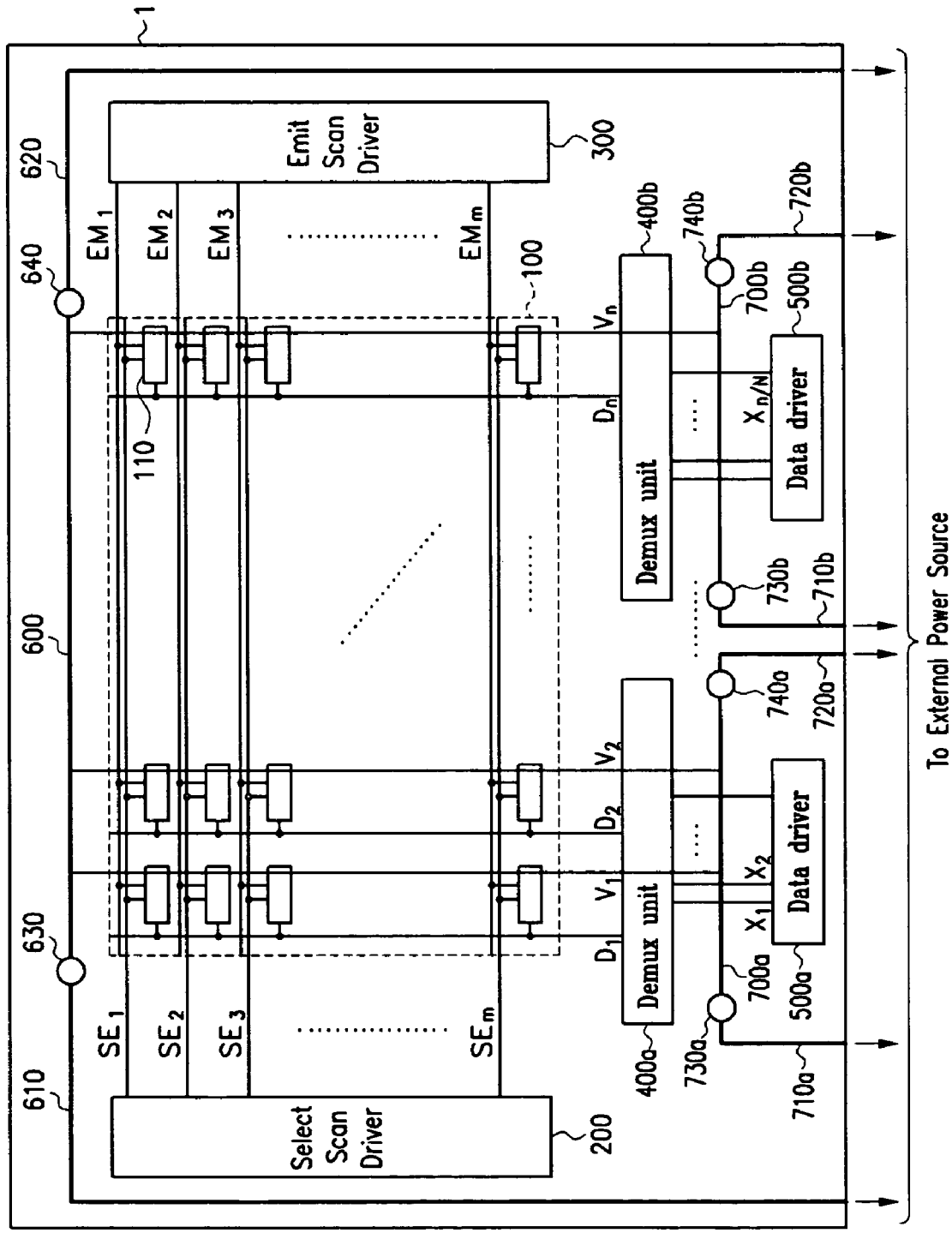
FIG. 3 shows the display device of FIG. 2 including a plurality of data drivers and demultiplexer units.

FIG. 2 shows a simplified view of a display device using a demultiplexer according to a first exemplary embodiment of the present invention. FIG. 3 shows a diagram of the display device of FIG. 2 including a plurality of data drivers and demultiplexers.

As shown in FIG. 2, the display device includes an insulation substrate 1 divided into a display area 100 which is visible to a user of the display device as a screen, and an outer surrounding area. A select scan driver 200, an emit scan driver 300, a demultiplexer unit 400, and a data driver 500 are formed on the surrounding area. According to one embodiment, data driver 500 may be formed not on the surrounding area of insulation substrate 1 but at a separate position and be coupled to insulation substrate 1, which is different from the illustration of FIG. 2.

Display area 100 includes a plurality of data lines $D_1$ to $D_n$, a plurality of select scan lines $SE_1$ to $SE_m$, a plurality of emit scan lines $EM_1$ to $EM_m$, and a plurality of pixel circuits 110. According to one embodiment, select and emit scan lines $SE_1$ to $SE_m$ and $EM_1$ to $EM_m$ are formed on insulation substrate 1, and gate electrodes (not illustrated) are coupled to the respective scan lines $SE_1$ to $SE_m$ and $EM_1$ to $EM_m$ which are covered with an insulation film (not illustrated). A semiconductor layer (not illustrated) made of silicon, such as, for example, amorphous silicon or polycrystalline silicon, is formed on the bottom of the gate electrode with an insulation layer therebetween. Data lines $D_1$ to $D_n$ are formed on the insulation film which covers scan lines $SE_1$ to $SE_m$ and $EM_1$ to $EM_m$, and source and drain electrodes are coupled to the respective data lines $D_1$ to $D_n$. The gate electrode, the source electrode, and the drain electrode configure three terminals of a thin-film transistor (TFT), and a semiconductor layer provided between the source electrode and the drain electrode is a channel layer of the transistor.

Referring to FIG. 2, data lines $D_1$ to $D_n$ extend in the vertical direction and transmit data currents for displaying images to pixel circuits 110. Select scan lines $SE_1$ to $SE_m$ and emit scan lines $EM_1$ to $EM_m$ extend in the horizontal direction and transmit select signals and emit signals to pixel circuits 110, respectively. Two adjacent data lines and two adjacent select scan lines define a pixel area where pixel circuit 110 is formed.

According to one embodiment, select scan driver 200 sequentially applies select signals to select scan lines $SE_1$ to $SE_m$, and emit scan driver 300 sequentially applies emit signals to emit scan lines $EM_1$ to $EM_m$. Data driver 500 time-divides and applies the data signals to demultiplexer unit 400, and demultiplexer unit 400 applies the time-divided data signals to data lines $D_1$ to $D_n$. When demultiplexer unit 400 performs 1:N demultiplexing, the number of signal lines $X_1$ to $X_{n/N}$ for transmitting the data signals to demultiplexer unit 400 from data driver 500 is n/N. That is, signal line $X_1$ transmits the time-divided and applied data signals to N data lines $D_1$ to $D_N$.

In this instance, select and emit scan drivers 200, 300, demultiplexer unit 400, and data driver 500 are mounted in an IC format on insulation substrate 1, and are coupled to scan lines $SE_1$ to $SE_m$ and $EM_1$ to $EM_m$, to signal lines $X_1$ to $X_{n/N}$, and to data lines $D_1$ to $D_n$ formed on insulation substrate 1. In addition, select and emit scan drivers 200, 300, demultiplexer unit 400, and/or data driver 500 may be formed on the same layer as the layers on which scan lines $SE_1$ to $SE_m$ and $EM_1$ to $EM_m$, signal lines $X_1$ to $X_{n/N}$, and data lines $D_1$ to $D_n$, and transistors of the pixel circuits are formed on insulation substrate 1. Further, data driver 500 may be mounted as a chip on a tape carrier package (TCP), a flexible printed circuit (FPC), or a tape automatic bonding (TAB) coupled to demultiplex unit 400.

Referring again to FIG. 2, a plurality of vertical lines $V_1$ to $V_n$ transmit a power supply voltage to pixel circuits 110 on display area 100. Vertical lines $V_1$ to $V_n$ may be formed on the same layer as that of data lines $D_1$ to $D_n$ without being superimposed on scan lines $SE_1$ to $SE_m$ and $EM_1$ to $EM_m$.

Power line 600 formed in the horizontal direction on the top of insulation substrate 1 is coupled to first ends of vertical lines $V_1$ to $V_n$. Power line 700 formed in the horizontal direction passes between demultiplexer unit 400 and data driver 500. Vertical lines $V_1$ to $V_n$ extend to pass through demultiplexer unit 400 and couple second ends of vertical lines $V_1$ to $V_n$ to power line 700. In this instance, power line 700 is formed on a layer different from that of signal lines $X_1$ to $X_{n/N}$ so that power line 700 may not be superimposed on signal lines $X_1$ to $X_{n/N}$.

Power supply lines 610, 620 are formed on insulation substrate 1 and coupled to power line 600 of display area 100 through first power supply points 630, 640. In a similar manner, power supply lines 710, 720 are formed on insulation substrate 1 and coupled to power line 700 of display area 100 through power supply points 730, 740. Power supply lines 610, 620 extend from power supply points 630, 640 and overhang scan drivers 200, 300 in the horizontal direction, and further extend in the vertical direction so that power supply lines 610, 620 may not be superimposed on scan lines $SE_1$ to $SE_m$ and $EM_1$ to $EM_m$, on data lines $D_1$ to $D_n$, and on signal lines $X_1$ to $X_{n/N}$. In a like manner, power supply lines 710, 720 extend in the vertical direction from power supply points 730, 740 so that power supply lines 710, 720 may not be superimposed on scan lines $SE_1$ to $SE_m$ and $EM_1$ to $EM_m$, on data lines $D_1$ to $D_n$, and on signal lines $X_1$ to $X_{n/N}$.

In this instance, first ends of power supply lines 610, 620, 710, 720 extended in the vertical direction are coupled to a pad (not illustrated), and further coupled to an external circuit board through the pad.

According to one embodiment, the widths of power lines 600, 700 and power supply lines 610, 620, 710, 720 are larger than those of vertical lines $V_1$ to $V_n$ since they transmit the current or the voltage to vertical lines $V_1$ to $V_n$.

Accordingly, four power supply points 630, 640, 730, 740 are formed on insulation substrate 1 to help solve the voltage drop generated on the bottom of vertical lines $V_1$ to $V_n$.

When a plurality of demultiplexer units 400a, 400b and data drivers 500a, 500b are formed as shown in FIG. 3, power supply lines 710a, 710b, 720a, 720b are additionally arranged between the two data drivers 500a, 500b to increase the number of power supply points 630, 640, 730a, 730b, 740a, 740b.

Referring to FIGS. 4 to 8, a display device with a demultiplexer unit including sample/hold circuits will be described. For ease of description, the demultiplexer unit is described to perform 1:2 demultiplexing, and first signal line $X_1$ and data lines $D_1$ and $D_2$ corresponding to signal line $X_1$ are exemplified.

Figure 4:
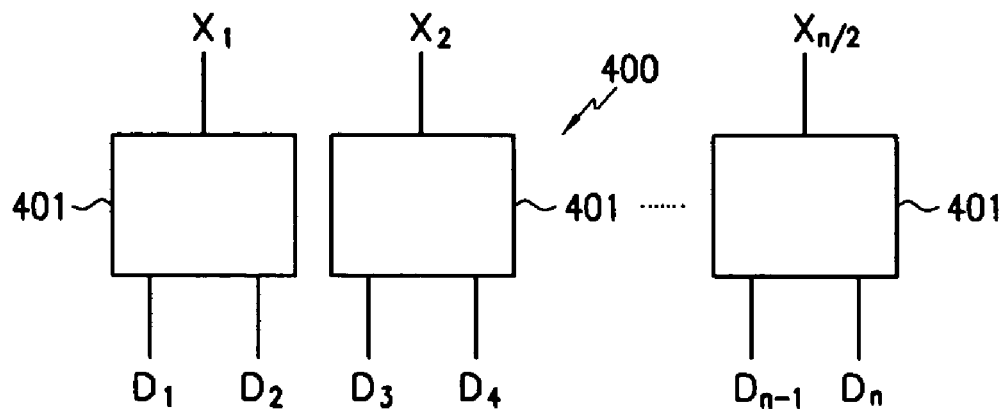
FIG. 4 shows a demultiplexer unit according to an exemplary embodiment of the present invention.
Figure 5:
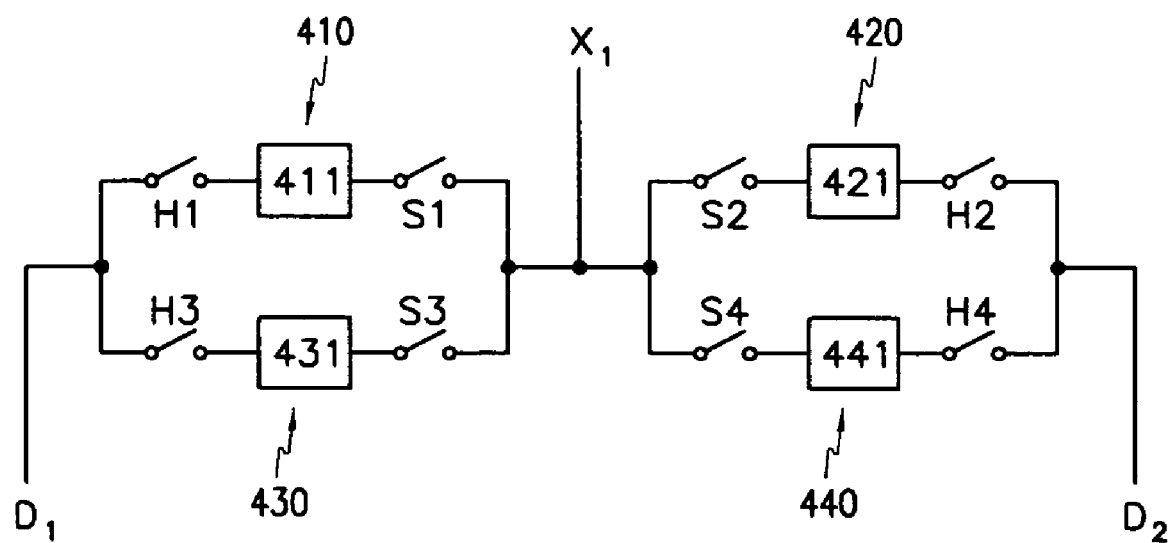
FIG. 5 shows a demultiplexer including sample/hold circuits.

As shown in FIG. 4, demultiplexer unit 400 includes a plurality of demultiplexers 401. Referring to FIGS. 4 and 5, demultiplexer 401 includes four sample/hold circuits 410, 420, 430, 440. The sample/hold circuits 410, 420, 430, 440 respectively include sampling switches S1, S2, S3, S4, data storage units 411, 421, 431, 441, and holding switches H1, H2, H3, H4. First terminals of sampling switches S1, S2, S3, S4 of sample/hold circuits 410, 420, 430, 440 are respectively coupled to data storage units 411, 421, 431, 441, and first terminals of holding switches H1, H2, H3, H4 are respectively coupled to data storage units 411, 421, 431, 441. Second terminals of sampling switches S1, S2, S3, S4 of sample/hold circuits 410, 420, 430, 440 are coupled in common to signal line $X_1$. Second terminals of holding switches H1, H3 of sample/hold circuits 410, 430 are coupled in common to data line $D_1$, and second terminals of holding switches H2, H4 of sample/hold circuits 420, 440 are coupled in common to data line $D_2$. Second terminals of sampling switches S1, S2, S3, S4 coupled to signal line $X_1$ will hereinafter be referred to as input terminals, and second terminals of holding switches H1, H2, H3, H4 coupled to data lines $D_1$ and $D_2$ will be hereinafter referred to as output terminals.

When sampling switches S1, S2, S3, S4 are turned on, sample/hold circuits 410, 420, 430, 440 respectively sample the currents transmitted through sampling switches S1, S2, S3, S4 and store them in data storage units 411, 421, 431, 441 in a voltage format. When holding switches H1, H2, H3, H4 are turned on, sample/hold circuits 410, 420, 430, 440 respectively hold the currents corresponding to the voltages stored in data storage units 411, 421, 431, 441 through holding switches H1, H2, H3, H4.

Referring to FIG. 5, sample/hold circuits 410, 430 coupled between signal line $X_1$ and data line $D_1$ form a single sample/hold circuit unit, and sample/hold circuits 410, 430 alternately perform sampling and holding. In a like manner, sample/hold circuits 420, 440 coupled between signal line $X_1$ and data line $D_2$ form a single sample/hold circuit unit, and sample/hold circuits 420, 440 alternately perform sampling and holding.

According to one embodiment of the invention, a sampling function of the sample/hold circuit includes recording an input current in a data storage element in voltage format, a standby function includes maintaining the data recorded in the data storage element, and a holding function includes outputting a current corresponding to the data recorded in the data storage element.

Referring to FIGS. 6 and 7A to 7D, an operation of the demultiplexer shown in FIG. 5 will be described.

Figure 6:
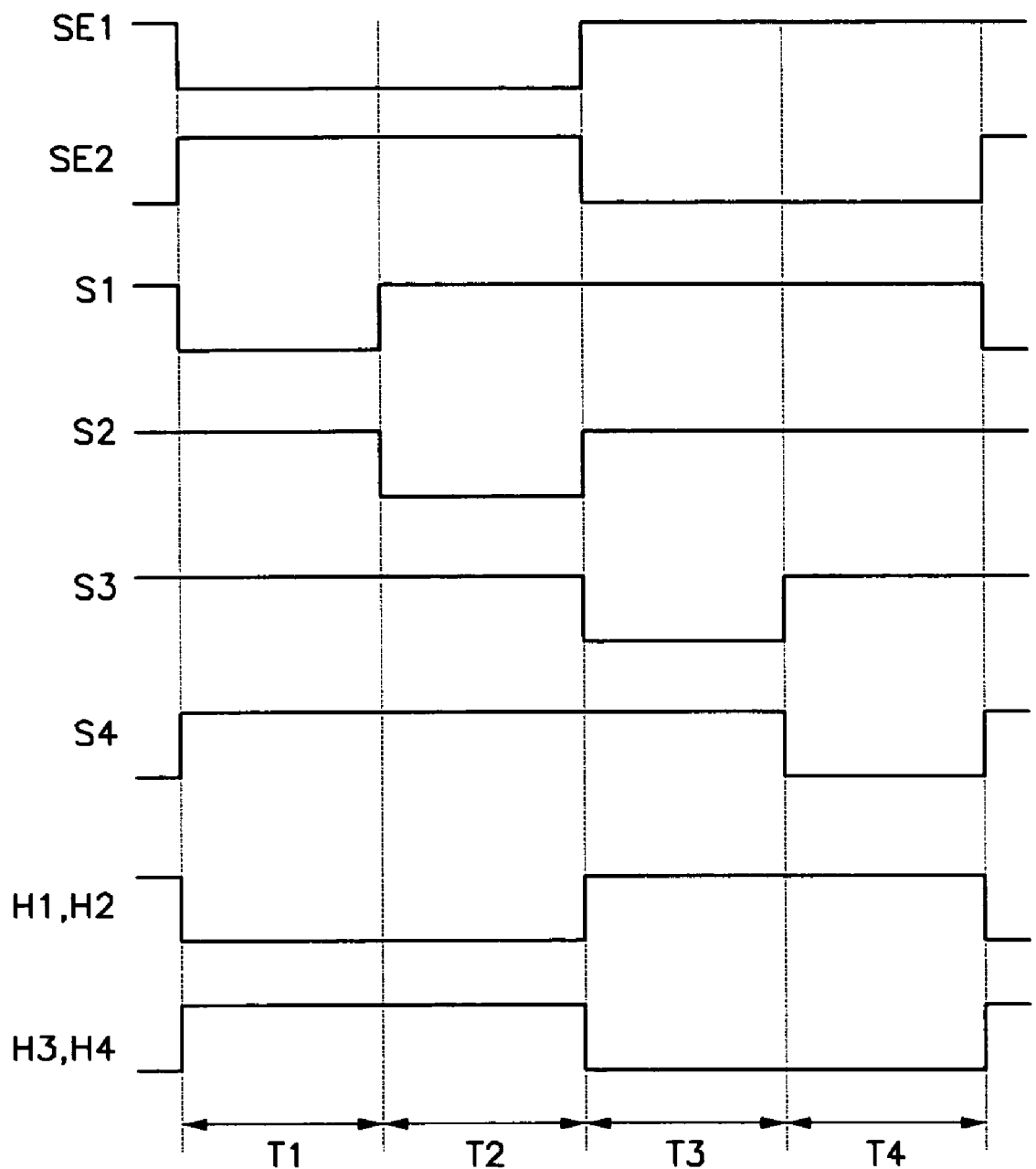
FIG. 6 shows a driving timing diagram of switches in the demultiplexer of FIG. 5.

FIG. 6 shows a driving timing diagram of switches in the demultiplexer of FIG. 5, and FIGS. 7A to 7D show an operation of the demultiplexer of FIG. 5 according to the timing diagram of FIG. 6. According to this timing diagram, sampling switches S1, S2, S3, S4 are turned on when a control signal level is low, and holding switches H1, H2, H3, H4 are turned on when the control signal level is high.

Figure 7A:
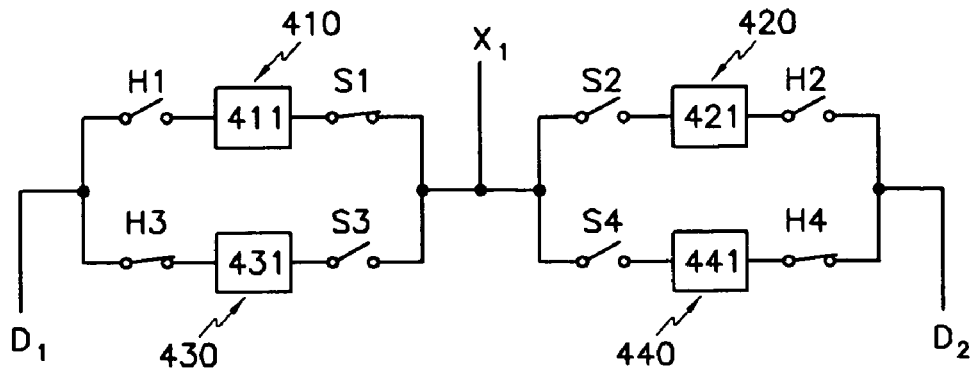
FIGS. 7A to 7D show an operation of the demultiplexer of FIG. 5 according to the timing diagram of FIG. 6.

Referring to FIGS. 6 and 7A, sampling switch S1 and holding switches H3, H4 are turned on in response to a control signal at time period T1. When sampling switch S1 is turned on, sample/hold circuit 410 samples the data current applied through signal line $X_1$ into storage element 411. When holding switches H3, H4 are turned on, sample/hold circuits 430, 440 hold the currents corresponding to the data stored in storage elements 431, 441 to data lines $D_1$, $D_2$. Sample/hold circuit 420 with the turned-off sampling switch S2 and holding switch H2 stand by.

Figure 7B:
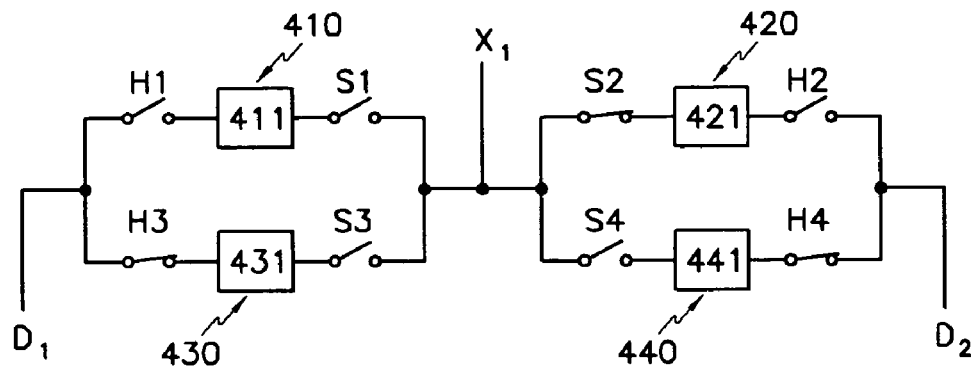

Referring to FIGS. 6 and 7B, sampling switch S1 is turned off and sampling switch S2 is turned on in response to a control signal while holding switches H3, H4 are turned on at time period T2. Since holding switches H3, H4 are turned on, the currents corresponding to the data stored in storage elements 431, 441 are consecutively held to data lines $D_1$, $D_2$. When sampling switch S2 is turned on, sample/hold circuit 420 samples the data current applied through the signal line $X_1$ into storage element 421.

Figure 7C:
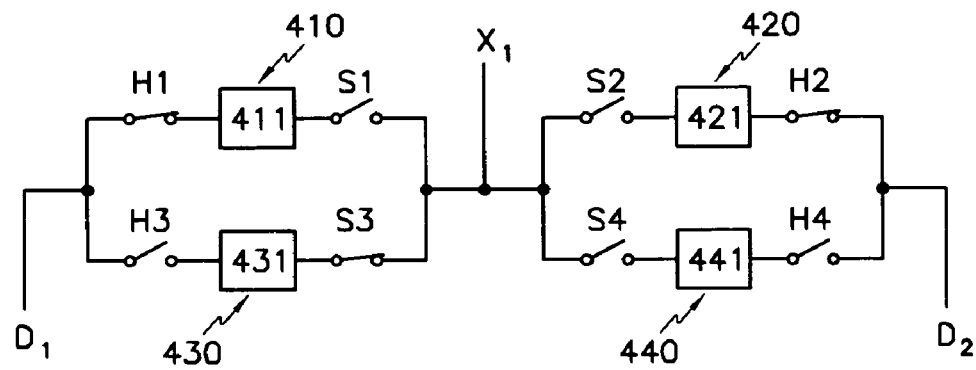

Referring to FIGS. 6 and 7C, sampling switch S2 and holding switches H3, H4 are turned off and sampling switch S3 and holding switches H1, H2 are turned on in response to a control signal at time period T3. When sampling switch S3 is turned on, sample/hold circuit 430 samples data current applied through signal line $X_1$ into storage element 431. When holding switches H1, H2 are turned on, sample/hold circuits 410, 420 respectively hold the currents corresponding to the data stored in storage elements 411, 421 to data lines $D_1$, $D_2$.

Figure 7D:
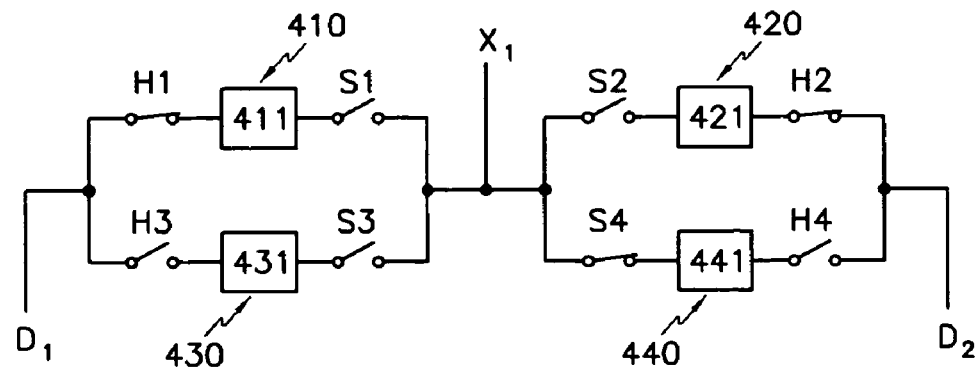

Referring to FIGS. 6 and 7D, sampling switch S3 is turned off and sampling switch S4 is turned on in response to a control signal while holding switches H1, H2 are turned on at time period T4. Since holding switches H1, H2 are turned on, the currents corresponding to the data stored in storage elements 411, 421 consecutively hold to data lines $D_1$, $D_2$. When sampling switch S4 is turned on, sample/hold circuit 440 samples the data current applied through signal line $X_1$ into storage element 441.

As described, sample/hold circuits 410, 420, 430, 440 of demultiplexer 401 are classified into two groups according to the sampling and holding operations. Sample/hold circuits 430, 440 of a second group hold previously sampled data to data lines $D_1$, $D_2$, while sample/hold circuits 410, 420 of a first group perform sampling of data current applied through signal line $X_1$. In a like manner, sample/hold circuits 410, 420 of the first group hold the previously sampled data while sample/hold circuits 430, 440 of the second group perform sampling. Since, according to one embodiment of the invention, holding switches H1, H2 are operated at substantially the same time, they may be driven with the same control signal, and holding switches H3, H4 may be driven with a same control signal in a like manner.

In this instance, time periods T1, T2 correspond to a period during which data is applied to a pixel circuit coupled to one row of a scan line according to a select signal (hereinafter referred to as a "horizontal period"), and time periods T3, T4 correspond to a next horizontal period. Sufficient time for programming data to the pixels may therefore be obtained since the data current may be consecutively applied to a particular data line during each horizontal period, and the data current may be transmitted to the particular data line during a particular frame since time periods T1 to T4 are repeated.

Since the four sample/hold circuits included in the demultiplexer of FIG. 5 may be substantially identically realized, sample/hold circuit 410 of FIG. 5 will be described in detail with reference to FIG. 8.

Figure 8:
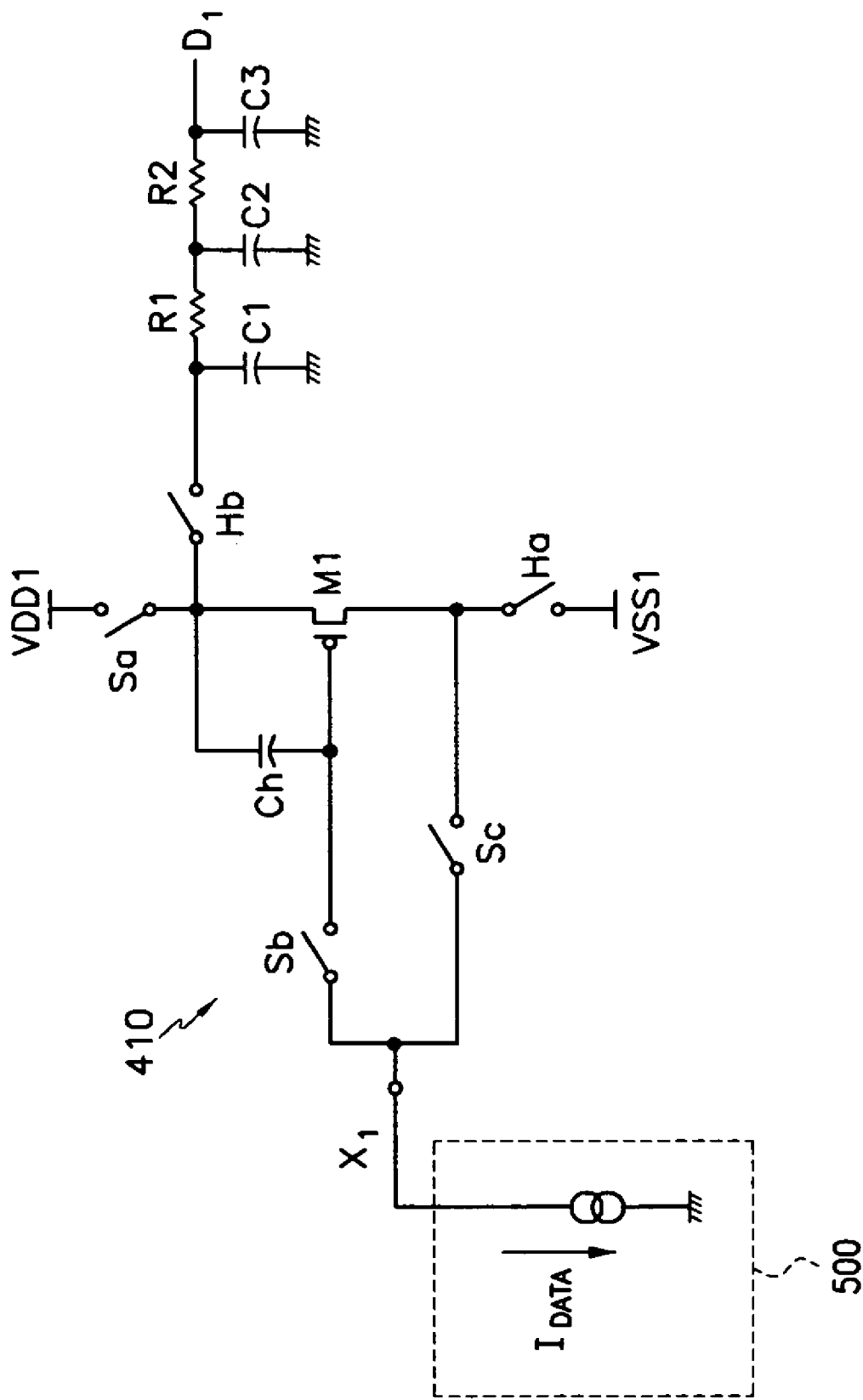
FIG. 8 shows a simplified circuit diagram of the sample/hold circuit of FIG. 5.

Sample/hold circuit 410 of FIG. 8 is coupled between signal line $X_1$ and data line $D_1$, and includes transistor M1, capacitor Ch, and five switches Sa, Sb, Sc, Ha, Hb. Parasitic resistance components and parasitic capacitance components are formed in data line $D_1$, where parasitic resistance components are exemplified to be R1 and R2, and parasitic capacitance components are exemplified to be C1, C2, and C3. Transistor M1 is, according to one embodiment, a p-channel field-effect transistor, in particular, a metal oxide semiconductor field-effect transistor (MOSFET).

Switch Sa is coupled between power supply voltage VDD1 and a source of transistor M1. Switch Ha is coupled between power supply voltage VSS1 and a drain of transistor M1. Since, according to the illustrated embodiment, transistor M1 is a p-channel type, power supply voltage VDD1 has a voltage greater than power supply voltage VSS1, and it is supplied by vertical lines $V_1$ to $V_n$ coupled to power line 700. Switch Sb is coupled between signal line $X_1$ which is an input terminal and the gate of transistor M1, and switch Hb is coupled between the source of transistor M1 and data line $D_1$ which is an output terminal. Switch Sc is coupled between signal line $X_1$ and the drain of the transistor, and diode-connects transistor M1 when switches Sb and Sc are turned on. In this instance, switch Sc can be coupled between the gate and the drain of transistor M1 to diode-connect transistor M1. When switch Sc is coupled between the gate and the drain of transistor M1, switch Sb can be coupled between signal line $X_1$ and the drain of transistor M1.

An operation of sample/hold circuit 410 of FIG. 8 will be described. According to one embodiment, switches Sa, Sb, Sc are turned on/off at substantially the same time, and switches Ha, Hb are turned on/off at substantially the same time.

When switches Sa, Sb, Sc are turned on and switches Ha, Hb are turned off, transistor M1 is diode-connected, the current is supplied to capacitor Ch which is then charged with a voltage, the gate potential of transistor M1 is lowered, and the current accordingly flows to the drain from the source. Upon passage of a certain period of time, the charged voltage of capacitor Ch is increased, and the drain current of transistor M1 corresponds to data current $I_{DATA}$ provided from signal line $X_1$, the charged current of capacitor Ch is no longer increased, and hence, capacitor Ch is charged with a constant voltage. In this instance, the relation between an absolute value $V_{SG}$ of a voltage between the source and the gate of transistor M1 (hereinafter referred to as a "source-gate voltage") and data current $I_{DATA}$ provided from signal line $X_1$ satisfies Equation 1. In this manner, sample/hold circuit 410 samples the data current provided from signal line $X_1$.

$$I_{DATA} = \frac{\beta}{2}(V_{SG} - V_{TH})^2 \qquad \text{Equation 1}$$

where β is a constant determined by a channel width and a channel length of transistor M1, and $V_{TH}$ is an absolute value of a threshold value of transistor M1.

When switches Sa, Sb, Sc are turned off and switches Ha, Hb are turned on, the current corresponding to source-gate voltage $V_{SG}$ charged in capacitor Ch, that is, data current $I_{DATA}$ is transmitted to data line $D_1$ through switch Hb. In this manner, sample/hold circuit 410 holds the current to data line $D_1$.

Sample/hold circuit 410 maintains the voltage charged in capacitor Ch since switches Sa, Sb, Sc, Ha, Hb are turned off while sample/hold circuit 420 of FIG. 5 performs sampling at time period T2. That is, sample/hold circuit 410 enters a standby state.

Switches Sa, Sb, Sc correspond to sampling switch S1 of FIG. 5 since sample/hold circuit 410 performs sampling when switches Sa, Sb, Sc are turned on, and switches Ha, Hb correspond to holding switch H1 of FIG. 5 since sample/hold circuit 410 performs holding when switches Ha, Hb are turned on. Capacitor Ch and transistor M1 correspond to data storage element 411 since they function to store a voltage corresponding to the data current. Switches Sa, Sb, Sc, Ha, Hb may be realized with p-channel or n-channel FETS. Furthermore, switches Sa, Sb, Sc may be realized with same conductivity type transistors, and switches Ha, Hb realized with same conductivity type transistors in a similar manner. Furthermore, switches Sa, Sb, Sc may be realized with the p-channel transistors and switches Ha, Hb realized with n-channel transistors so that they may be driven according to the timing diagram of FIG. 6.

Sample/hold circuit 410 of FIG. 8 sources the data current to signal line $X_1$, that is, the input terminal, during the sampling operation, and sinks the data current from data line $D_1$, that is, the output terminal during the holding operation. Accordingly, sample/hold circuit 410 shown in FIG. 8 may be used together with data driver 500 for sinking the data current at signal line $X_1$, that is, a data driver having a current sink type output terminal. Since a driving IC having a current sink type output terminal is generally cheaper than a driving IC having a current source type output terminal, the cost of the data driver 500 is reduced.

Also, when transistor M1 is realized with an n-channel FET and the relative voltage levels of power supply voltages VDD1 and VSS1 are exchanged with each other in FIG. 8, a sample/hold circuit having a current sink type input terminal and a current source type output terminal may be realized. No detailed description on the configuration of the sample/hold circuit will be provided since it will be apparent to a person of skill in the art.

In the first embodiment illustrated in FIG. 5, the two sample/hold circuits are coupled in parallel between the signal line and the data line for forming a single sample/hold circuit unit. According to a second embodiment illustrated in FIGS. 9 to 11C, two sample/hold circuits are coupled in series between the signal line and the data line. For ease of description, a demultiplexer unit according to the second embodiment is described as performing 1:2 demultiplexing.

Figure 9:
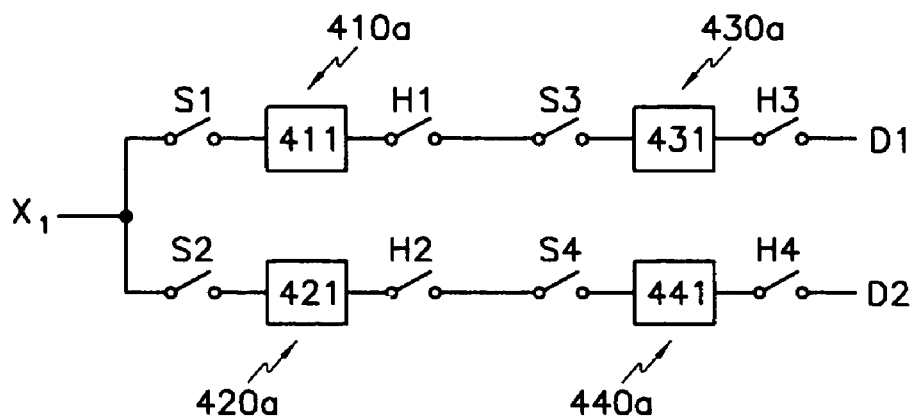
FIG. 9 shows a demultiplexer according to a second exemplary embodiment of the present invention.

FIG. 9 shows a demultiplexer according to the second exemplary embodiment of the present invention.

Referring to FIG. 9, sample/hold circuits 410a, 430a are coupled in series and sample/hold circuits 420a, 440a are also coupled in series. In this regard, an output terminal of sample/hold circuit 410a is coupled to an input terminal of sample/hold circuit 430a, and an output terminal of sample/hold circuit 430a is coupled to data line $D_1$ for forming a single sample/hold circuit unit. In a like manner, an output terminal of sample/hold circuit 420a is coupled to an input terminal of sample/hold circuit 440a, and an output terminal of sample/hold circuit 440a is coupled to data line $D_2$ in forming another single sample/hold circuit unit. The input terminals of sample/hold circuits 410a, 420a are coupled in common to signal line $X_1$.

An operation of the demultiplexer of FIG. 9 will be described with reference to FIGS. 10 and 11A to 11C.

Figure 10:
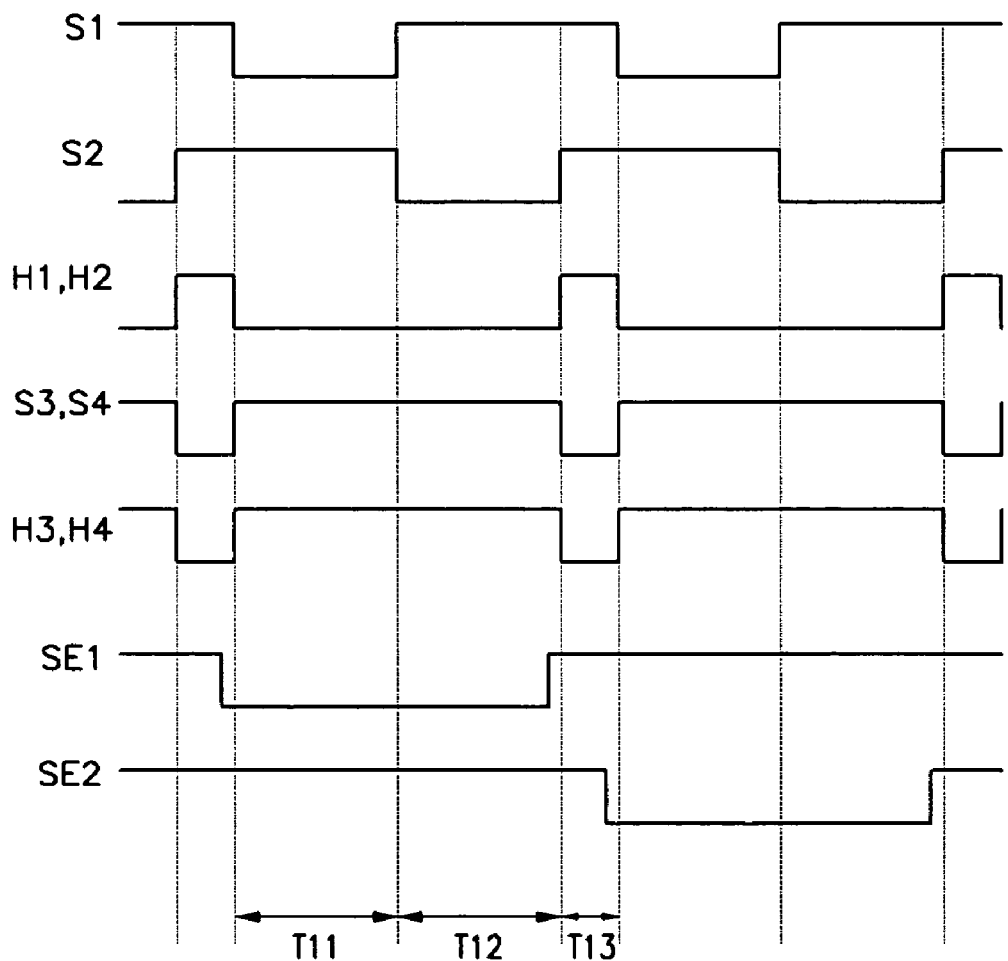
FIG. 10 shows a driving timing diagram of switches in the demultiplexer of FIG. 9.

FIG. 10 shows a driving timing diagram of switches in the demultiplexer of FIG. 9, and FIGS. 11A to 11C show an operation of the demultiplexer of FIG. 9 according to the timing diagram of FIG. 10. According to this timing diagram, sampling switches S1, S2, S3, S4 are turned on when a control signal level is low, and holding switches H1, H2, H3, H4 are turned on when the control signal level is high.

Figure 11A:
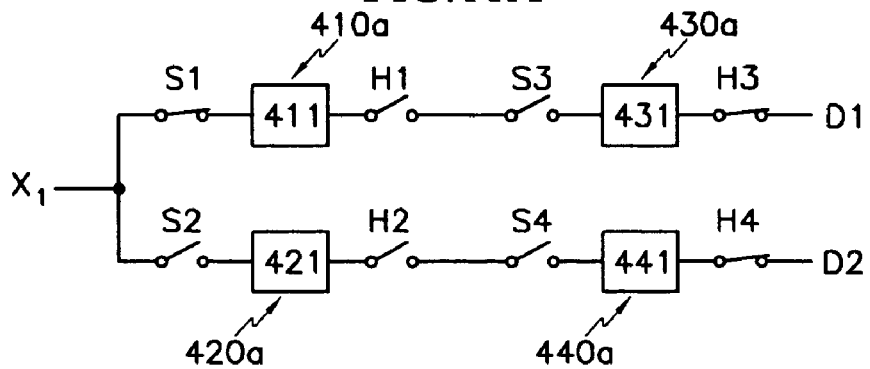
FIGS. 11A to 11C show an operation of the demultiplexer of FIG. 9 according to the timing diagram of FIG. 10.

Referring to FIGS. 10 and 11A, sampling switch S1 and holding switches H3, H4 are turned on in response to a control signal at time period T11. When sampling switch S1 is turned on, sample/hold circuit 410a samples the data current applied through signal line $X_1$ into storage element 411. When holding switches H3 and H4 are turned on, sample/hold circuits 430a, 440a hold the currents corresponding to the data stored in storage elements 431 and 441 to data lines $D_1$, $D_2$. Sample/hold circuit 420a with turned-off sampling switch S2 and holding switch H2 stand by.

Figure 11B:
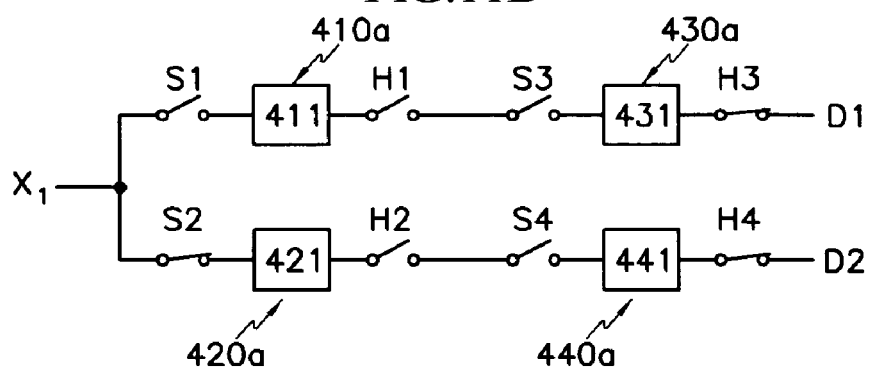

Referring to FIGS. 10 and 11B, sampling switch S1 is turned off and sampling switch S2 is turned on in response to a control signal while holding switches H3 and H4 are turned on at time period T12. Since holding switches H3, H4 are turned on, sample/hold circuits 430a, 440a consecutively hold the currents corresponding to the data stored in storage elements 431, 441 to data lines $D_1$, $D_2$. When sampling switch S2 is turned on, sample/hold circuit 420a samples the data current applied through signal line $X_1$ into storage element 421.

Figure 11C:
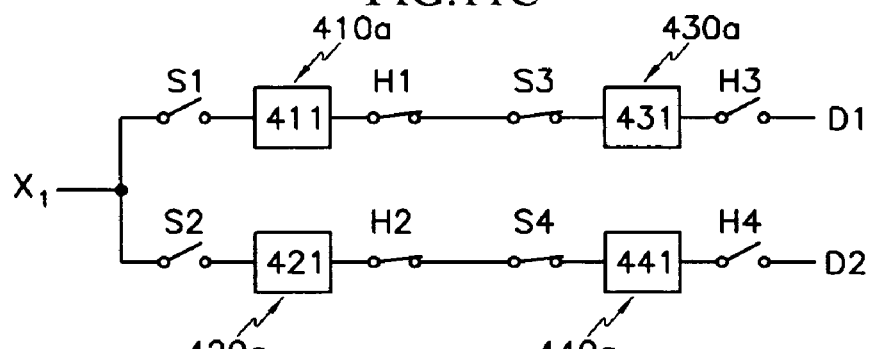

Referring to FIGS. 10 and 11C, sampling switch S2 and holding switches H3, H4 are turned off and the holding switches H1, H2 and sampling switches S3, S4 are turned on in response to a control signal at time period T13. Sample/hold circuits 410a, 420a hold the currents sampled to storage elements 411, 421 during time periods T11, T12, and sample/hold circuits 430a, 440a sample the currents respectively held by the sample/hold circuits 410a, 420a into storage elements 431, 441.

As described, sample/hold circuits 410a, 420a, 430a, 440a of demultiplexer 401 are classified into two groups according to the sampling and holding operations. Sample/hold circuits 410a, 420a of a first group perform sampling during time periods T11, T12, and sample/hold circuits 430a, 440a of a second group hold the data sampled during time period T13 of a previous horizontal period. Sample/hold circuits 410a, 420a of the first group during time period T13 hold the data sampled during time periods T11, T12, and sample/hold circuits 430a, 440a of the second group sample the data held by sample/hold circuits 410a, 420a of the first group. Since sampling switches S3, S4 are operated at the same time period, they may be driven with the same control signal. Similarly, holding switches H1, H2 may be driven with a same control signal, and holding switches H3, H4 may also be driven with a same control signal.

In this instance, time periods T11 to T13 correspond to a single horizontal period, and time data current may be transmitted to a particular data line during a particular frame by repeating time periods T11 to T13.

In this case, since no data current is applied to the data line during time period T13 of a particular horizontal period, the time assigned for data programming could be reduced. However, data storage element 411 and data storage element 431 are continuously coupled, and a parasitic capacitance provided between data storage elements 411, 431 is small enough that it may be ignored. In a like manner, the parasitic capacitance provided between data storage elements 421, 441 is small enough that it may also be ignored. Therefore, the time used during time period T13 may be substantially less than the time for supplying the data current, and hence, no substantial influence is generated when no data current is supplied to the data line during time period T13.

The four sample/hold circuits included in the demultiplexer of FIG. 9 may be realized with the sample/hold circuit shown in FIG. 8. Since holding switches H1, H2 of sample/hold circuits 410a, 420a and sampling switches S3, S4 of sample/hold circuits 430a, 440a are turned on/off at the same time as shown in FIG. 10, holding switches H1, H2 or sampling switches S3, S4 may be eliminated as described with reference to FIGS. 12 to 14.

Figure 12:
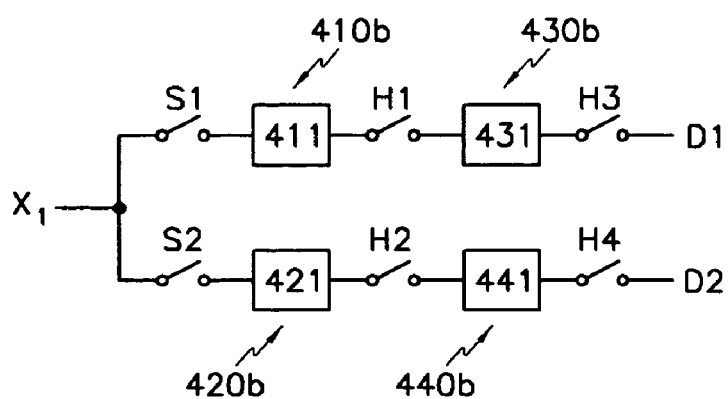
FIG. 12 shows a demultiplexer according to a third exemplary embodiment of the present invention.
Figure 13:
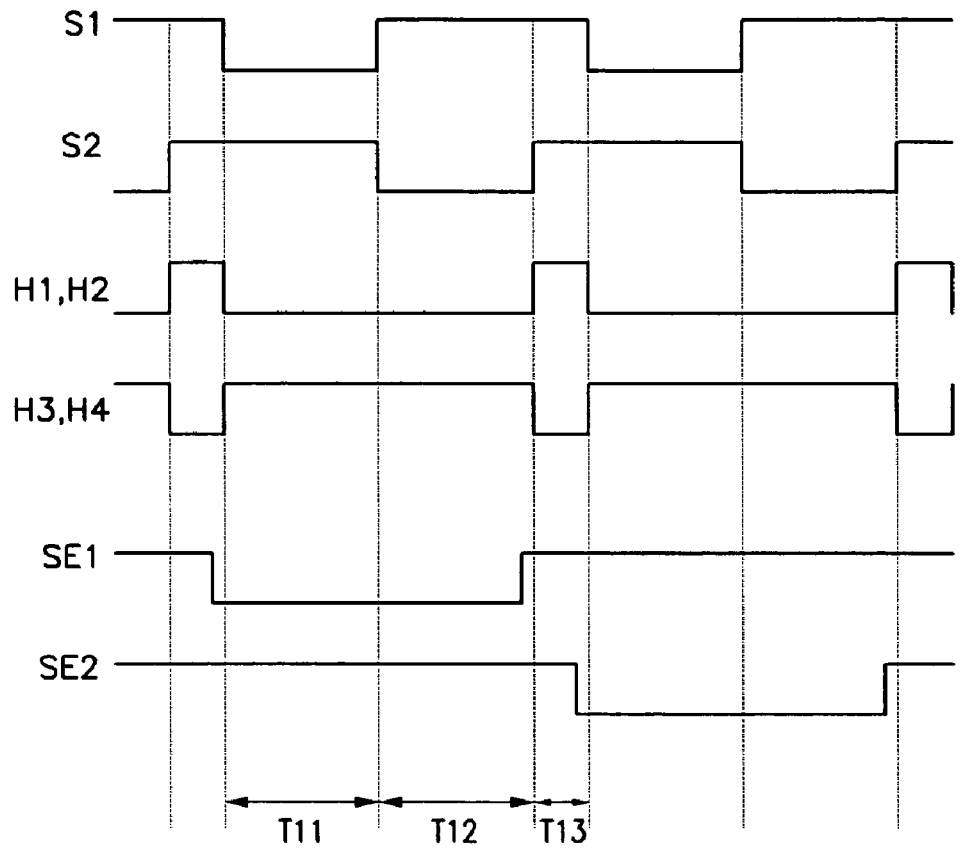
FIG. 13 shows a driving timing diagram of switches in the demultiplexer of FIG. 12.

FIG. 12 shows a demultiplexer according to a third exemplary embodiment of the present invention. For ease of description, the demultiplexer according to the third exemplary embodiment is described as performing 1:2 demultiplexing. FIG. 13 shows a driving timing diagram of switches in the demultiplexer of FIG. 12. According to this timing diagram, sampling switches S1, S2 are turned on when a control signal level is low, and holding switches H1, H2, H3, H4 are turned on when the control signal level is high.

Referring to FIG. 12, the demultiplexer according to the third embodiment has a configuration in which sampling switches of sample/hold circuits 430a, 440a are eliminated from the demultiplexer of FIG. 9. That is, as shown in FIG. 13, sample/hold circuits 410b, 420b perform holding and sample/hold circuits 430b, 440b perform sampling when holding switches H1, H2 of sample/hold circuits 410b, 420b are turned on during time period T13.

A single sample/hold circuit unit including two sample/hold circuits 410b, 430b coupled in series in FIG. 12 will now be described with reference to FIG. 14.

Figure 14:
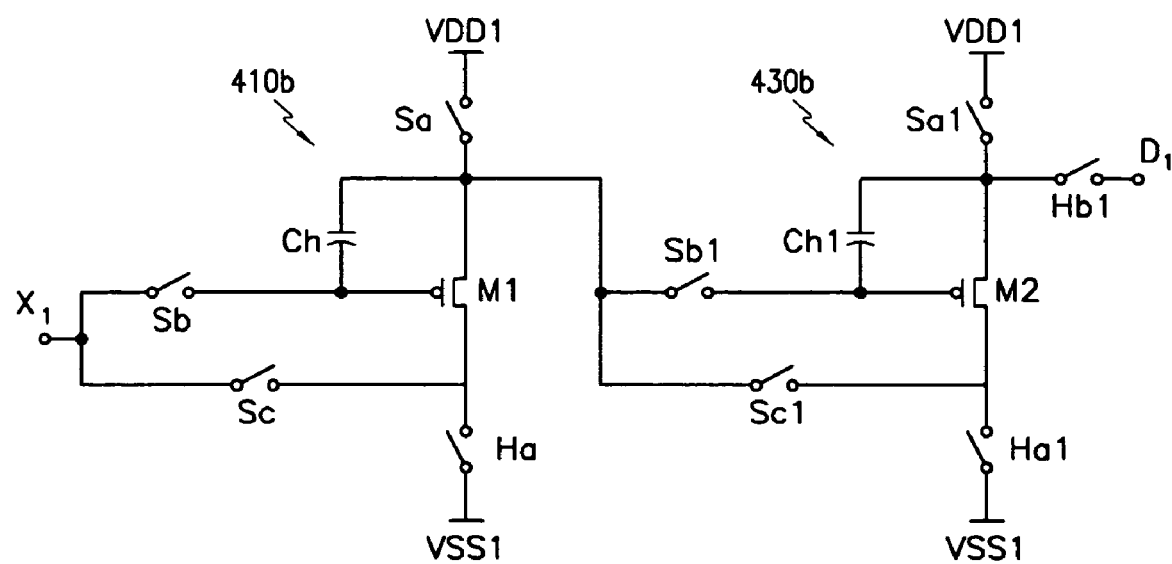
FIG. 14 shows a sample/hold circuit according to a third exemplary embodiment of the present invention.

FIG. 14 shows sample/hold circuit unit according to the third exemplary embodiment of the present invention.

As shown, sample/hold circuits 410b, 430b have a configuration in which the output terminal of sample/hold circuit of FIG. 8 is coupled to the input terminal of the same sample/hold circuit and holding switch Hb is eliminated from the sample/hold circuit of the previous stage.

In detail, sample and hold circuit 410b includes switches Sa, Sb, Sc, Ha, transistor M1, and capacitor Ch of FIG. 8, and their coupled states correspond to those of FIG. 8. Sample/hold circuit 430b includes switches Sa1, Sb1, Sc1, Ha1, Hb1, transistor M2, and capacitor Ch1, and their coupled states correspond to those of switches Sa, Sb, Sc, Ha, Hb, transistor M1, and capacitor Ch.

In summary, when switches Sa, Sb, Sc are turned on, a voltage corresponding to data current $I_{DATA}$ provided from signal line $X_1$ is stored in capacitor Ch. When switches Sa, Sb, Sc are turned off and switches Ha, Sa1, Sb1, Sc1 are turned on, the current corresponding to the voltage stored in capacitor Ch is output to the source of transistor M1, and the voltage corresponding to the current output to the source of transistor M1 is stored again in capacitor Ch1. When switches Ha, Sa1, Sb1, Sc1 are turned off and switches Ha1, Hb1 are turned on, the current corresponding to the voltage stored in capacitor Ch1 is output to data line $D_1$ through the source of transistor M2.

In this instance, switches Sa, Sb, Sc correspond to sampling switch S1 of FIG. 12 since sample/hold circuit 410b of the sample/hold circuit unit performs sampling when switches Sa, Sb, Sc are turned on. Switches Ha, Sa1, Sb1, Sc1 correspond to holding switch H1 of FIG. 12 since sample/hold circuit 410b performs holding and sample/hold circuit 430b performs sampling when switches Ha, Sa1, Sb1, Sc1 are turned on. Switches Ha1, Hb1 correspond to holding switch H3 of FIG. 12 since sample/hold circuit 430b performs holding when switches Ha1, Hb1 are turned on.

Switches Sa, Sb, Sc, Ha, Sa1, Sb1, Sc1, Ha1, Hb1 may be realized with p-channel or n-channel FETs. Furthermore, switches Sa, Sb, Sc may be realized with same conductivity type transistors, switches Ha, Sa1, Sb1, Sc1 realized with same conductivity type transistors, and switches Ha1, Hb1 realized with same conductivity type transistors. Also, switches Sa, Sb, Sc may be realized with p-channel transistors, and switches Ha, Sa1, Sb1, Sc1, Ha1, Hb1 realized with n-channel transistors so that they may be driven according to the timing of FIG. 13. Further, it is possible to divide the control signal for driving switch Ha and switches Sa1, Sb1, Sc1 and realize switch Ha with an n-channel transistor and switches Sa1, Sb1, Sc1 with p-channel transistors.

As described, the demultiplexer according to the first to third exemplary embodiments sequentially samples the data currents that have been time-divided and applied through signal line $X_1$ during one horizontal period, and applies the sampled currents to data lines $D_1$ and $D_2$ during a subsequent horizontal period. While performing a 1:N demultiplexing operation, the time for the demultiplexer to sample the data current corresponding to a single data line $D_1$ is about 1/N of one horizontal period. Therefore, demultiplexer 400 must generally sample the data current corresponding to a single data line during the time corresponding to 1/N of one horizontal period. In order to satisfy this condition, the capacitance component at signal line $X_1$ when data driver 500 applies the data current through signal line $X_1$ should be less than 1/N of the capacitance component at data line $D_1$ when demultiplexer 400 applies the sampled current through one data line $D_1$.

When data driver 500 applies the data current corresponding to a particular data line to demultiplexer 400 through signal line $X_1$, it drives parasitic capacitance component C1 formed by signal line $X_1$ and power line 700. When the metals which are insulated and cross data line D1 in the display area 100 are select scan lines $SE_1$ to $SE_m$ and emit scan lines $EM_1$ to $EM_m$, demultiplexer 400 drives parasitic component C2 formed by data line D1, select scan lines $SE_1$ to $SE_m$, and emit scan lines $EM_1$ to $EM_m$ when applying the sampled data current to data line $D_1$.

In general, the capacitance formed by two metallic plates is in proportion to the area of the facing metallic plates and is in inverse proportion to the distance between the two plates when the same dielectric matter is provided therebetween. The distances between the two facing metallic plates correspond to each other in parasitic capacitance components C1 and C2, and a length of one side of the metallic plate forming parasitic capacitance component C1 is given as a width of signal line $X_1$, a length of another side of parasitic capacitance component C1 is given as the width of power line 700, a length of one side of the metallic plate for forming parasitic capacitance component C2 is given as a width of data line $D_1$, and a length of another side of parasitic capacitance component C2 is given as the summation of widths of m select scan lines $SE_1$ to $SE_m$ and m emit scan lines $EM_1$ to $EM_m$.

For example, when widths of one of select scan lines $SE_1$ to $SE_m$ and one of emit scan lines $EM_1$ to $EM_m$ are respectively 7 μm, the width of power line 700 is 2 mm, and the width of data line $D_1$ corresponds to the width of signal line $X_1$ in the QCIF resolution (i.e., 176×220), the magnitude of capacitance component C1 becomes about ⅔ (2,000/(7×220×2)) of capacitance component C2. Accordingly, the above-described condition of 1/N is not satisfied, the demultiplexer unit cannot sample the current within the given time, and hence, the current sampling rate is to be increased. To achieve this, a precharge current may be applied before the current to be sampled is applied, which will be described in detail with reference to FIGS. 15 to 20B.

Referring to FIGS. 15, 16, 17A, and 17B, a fourth embodiment of applying the precharge current before sampling in the demultiplexer of FIG. 5 will be described. The fourth embodiment relates to a method for applying the precharge current to the demultiplexer according to the first embodiment.

Figure 15:
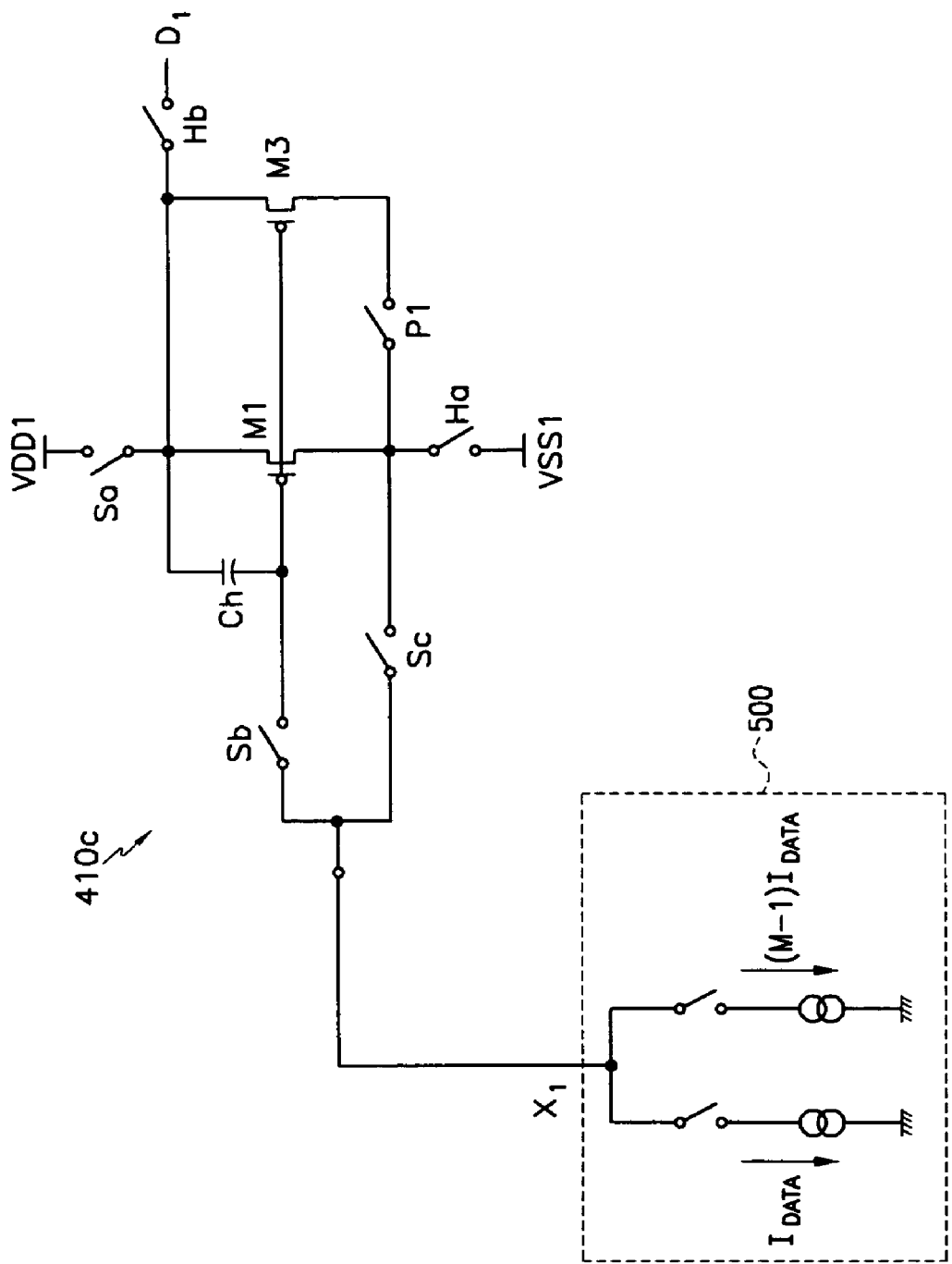
FIG. 15 shows a sample/hold circuit according to a fourth exemplary embodiment of the present invention.

FIG. 15 shows a sample/hold circuit 410c according to the fourth embodiment.

As shown, the sample/hold circuits in the demultiplexer according to the fourth embodiment further include a precharge circuit as opposed to the sample/hold circuit of FIG. 8.

In detail, the precharge circuit includes transistor M3 and precharge switch P1. Sample/hold circuits are respectively coupled to a precharge circuit, and the precharge circuits form a precharge unit. A source and a gate of transistor M3 are coupled to the source and gate of transistor M1, and switch P1 is coupled between the drain of transistor M1 and a drain of transistor M3. Transistor M3 has the same channel type as transistor M1, and is illustrated to be a p-channel FET similar to transistor M1. The ratio W3/L3 of channel width W3 to channel length L3 of transistor M3 is (M−1) times the ratio W1/L1 of channel width W1 to channel length L1 of transistor M1.

The precharge unit transmits precharge current $MI_{DATA}$ corresponding to M (M is a real number greater than 1) times data current $I_{DATA}$ to signal lines $X_1$ to $X_{n/N}$ before data driver 500 transmits the data current to demultiplexer unit 400. Also, data driver 500 generates an additional current for generating the precharge current together with the data current. The additional current is current $(M−1)I_{DATA}$ corresponding to (M−1) times data current $I_{DATA}$, and is generated from data current $I_{DATA}$ by using a current mirror circuit. Since the method for generating additional current $(M−1)I_{DATA}$ through the current mirror circuit is well known to a person skilled in the art, a detailed description is not provided herein.

Figure 16:
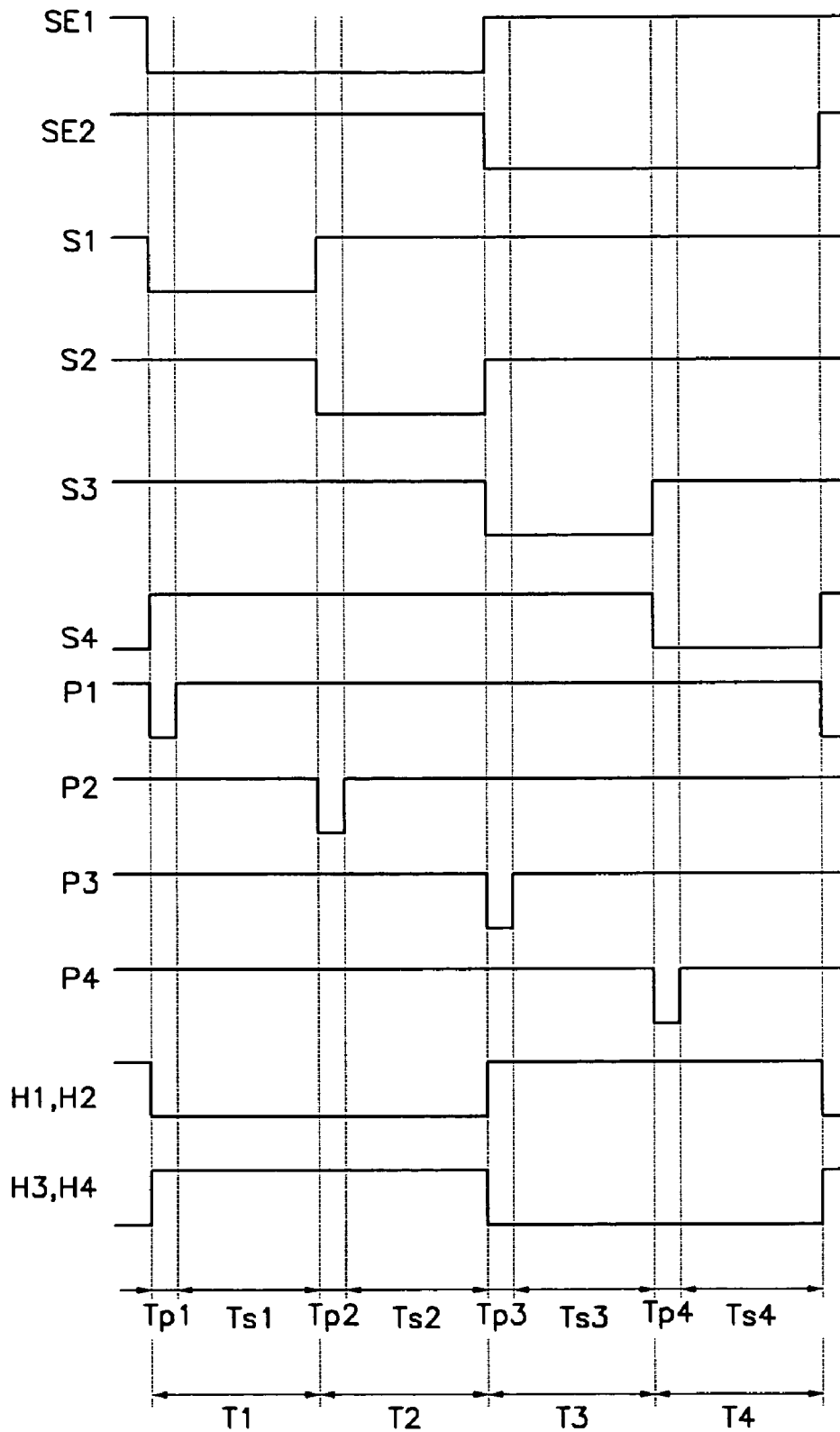
FIG. 16 shows a driving timing diagram for a precharge method according to a fourth exemplary embodiment of the present invention.
Figure 17A:
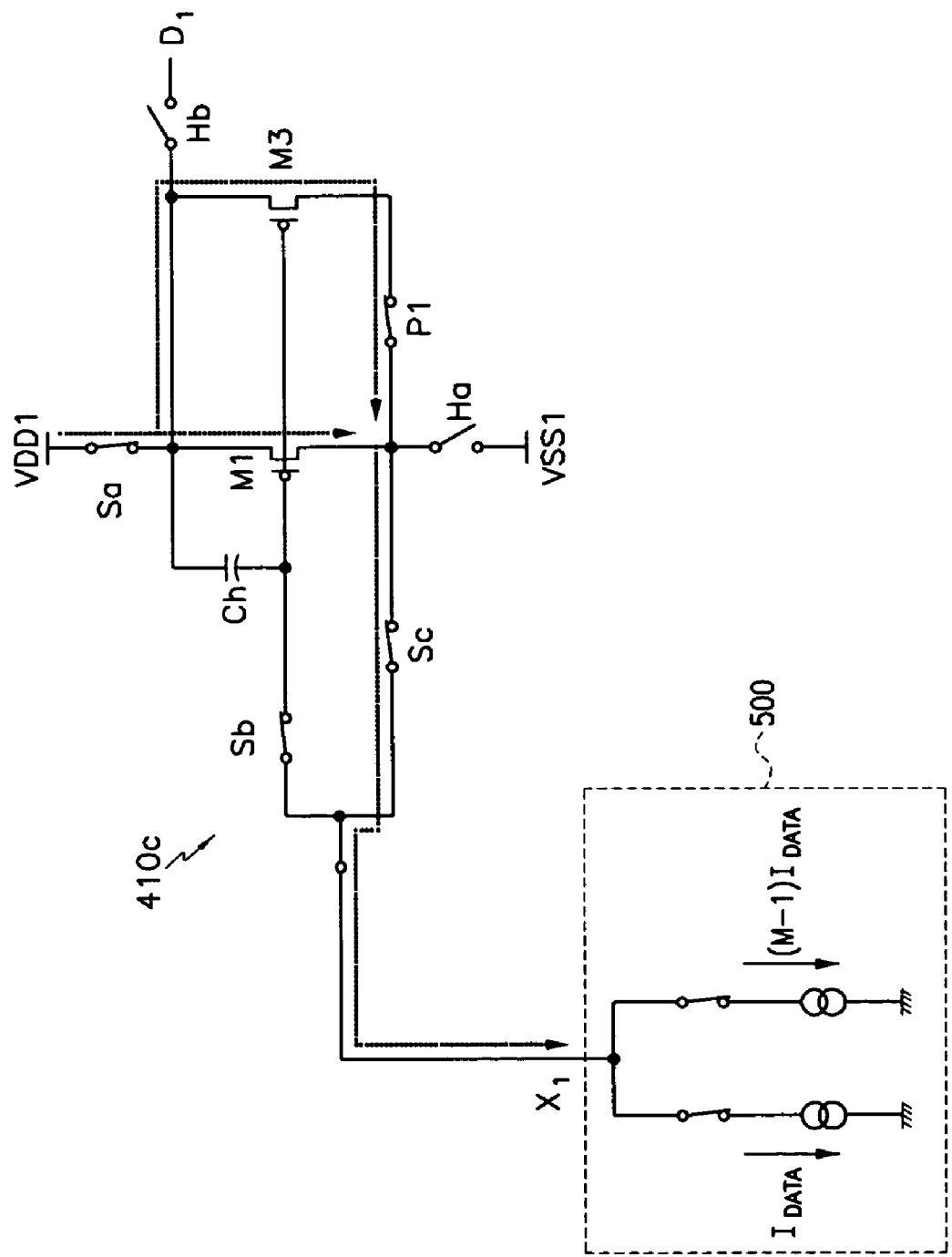
FIGS. 17A and 17B respectively show a precharge method according to a fourth exemplary embodiment of the present invention.
Figure 17B:
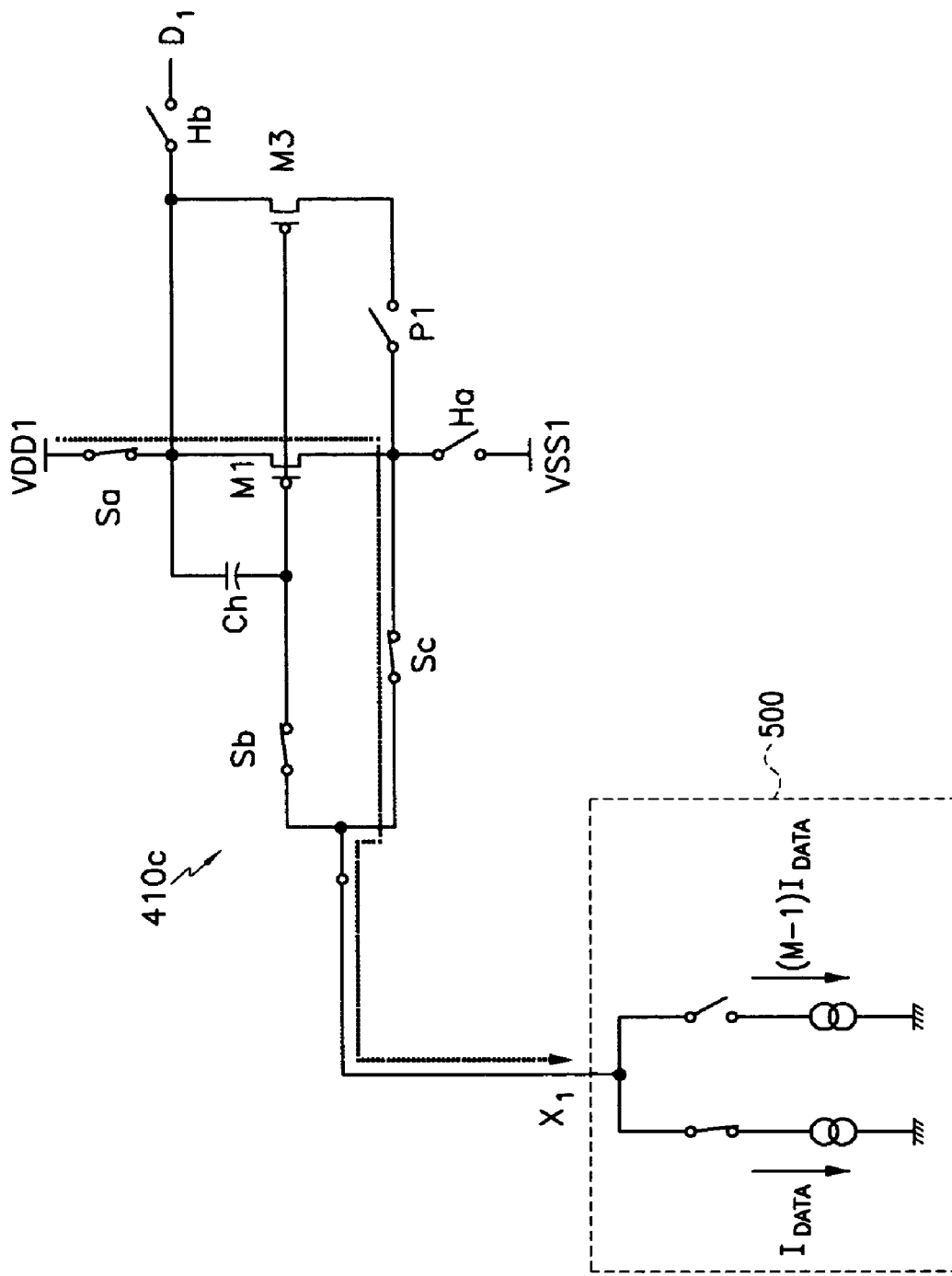

Referring to FIGS. 16, 17A, and 17B, an operation of the sample/hold circuit 410c of FIG. 15 will be described in detail.

FIG. 16 shows a driving timing diagram for a precharge method according to the fourth exemplary embodiment of the present invention, and FIGS. 17A and 17B respectively show a precharge method according to the fourth exemplary embodiment of the present invention. Precharge switches P1, P2, P3, P4 and sampling switches S1, S2, S3, S4, that is, switches Sa, Sb, Sc are turned on when control signal level is low, and holding switches H1, H2, H3, H4, that is, switches Ha and Hb are turned on when control signal level is high.

Referring to FIGS. 16 and 17A, switches Sa, Sb, Sc (similar to sampling switch S1 of FIG. 5) and precharge switch P1 are turned on and transistors M1, M3 are respectively diode-connected during precharge period Tp1. Data current $I_{DATA}$ and additional current $(M−1)I_{DATA}$ are concurrently applied to signal line $X_1$ from data driver 500. Since the ratio W3/L3 of the channel width to the channel length of transistor M3 is (M−1) times the ratio W1/L1 of the channel width to the channel length of transistor M1, current $(M−1)I_{DATA}$ is transmitted to the drain of transistor M3, and current $I_{DATA}$ is transmitted to the drain of transistor M1. As a result, signal line $X_1$ is charged with a voltage which is close to a voltage corresponding to data current $I_{DATA}$. In this case, sample/hold circuit 410c performs sampling since a predetermined voltage is charged in the capacitor Ch.

Time is generally needed for signal line $X_1$ to be charged with a voltage corresponding to data current $I_{DATA}$ according to precharge current $MI_{DATA}$ because of the parasitic capacitance formed in signal line $X_1$. However, since precharge current $MI_{DATA}$ is a current M times greater than data current $I_{DATA}$, signal line $X_1$ may be charged within a time shorter than the time for charging signal line X1 with data current $I_{DATA}$. Therefore, signal line $X_1$ may be charged with a voltage which is close to the voltage corresponding to data current $I_{DATA}$ even in a short precharge time period.

Referring to FIGS. 16 and 17B, additional current (M−1) $I_{DATA}$ is intercepted from data driver 500 and precharge switch P1 is concurrently turned off during sampling period Ts1. Data current $I_{DATA}$ provided from signal line $X_1$ is transmitted to the drain of transistor M1, and capacitor Ch is charged with the voltage corresponding to data current $I_{DATA}$.

That is, sample/hold circuit 410c performs sampling. In particular, since the precharge voltage close to data current $I_{DATA}$ is applied to signal line $X_1$ by the precharge operation, capacitor Ch is quickly charged with the voltage corresponding to data current $I_{DATA}$ when a parasitic capacitance component is provided in signal line $X_1$.

The precharge operation has been described by exemplifying a particular sample/hold circuit 410c. The precharge operation may be performed before the sampling operation when sample/hold circuits such as sample/hold circuits 410, 420, 430, 440 of FIG. 5 sequentially perform the sampling operation in demultiplexer 401. That is, as shown in FIG. 16, periods T1, T2, T3, T4 may be divided into precharge periods Tp1, Tp2, Tp3, Tp4, and sampling periods Ts1, Ts2, Ts3, Ts4. Elements P1, P2, P3, P4 in FIG. 16 respectively indicate precharge switches of the precharge unit formed in sample/hold circuits such as sample/hold circuits 410, 420, 430, 440 of FIG. 5. As a result, data current $I_{DATA}$ is sampled within a quick time since signal line $X_1$ is precharged with a voltage which is close to a voltage corresponding to data current $I_{DATA}$ before respective sample/hold circuits such as sample/hold circuits 410, 420, 430, 440 of FIG. 5 sample data current $I_{DATA}$.

The signal line can be precharged according to the same method by forming the above-described precharge unit in the demultiplexer of FIGS. 9 and 12. A fifth embodiment for precharging the signal line by the demultiplexer of FIG. 12 before performing a sampling operation will be described with reference to FIGS. 18, 19, 20A, and 20B. The fourth embodiment relates to a method for applying a precharge current to the demultiplexer according to the described second and third embodiments.

Figure 18:
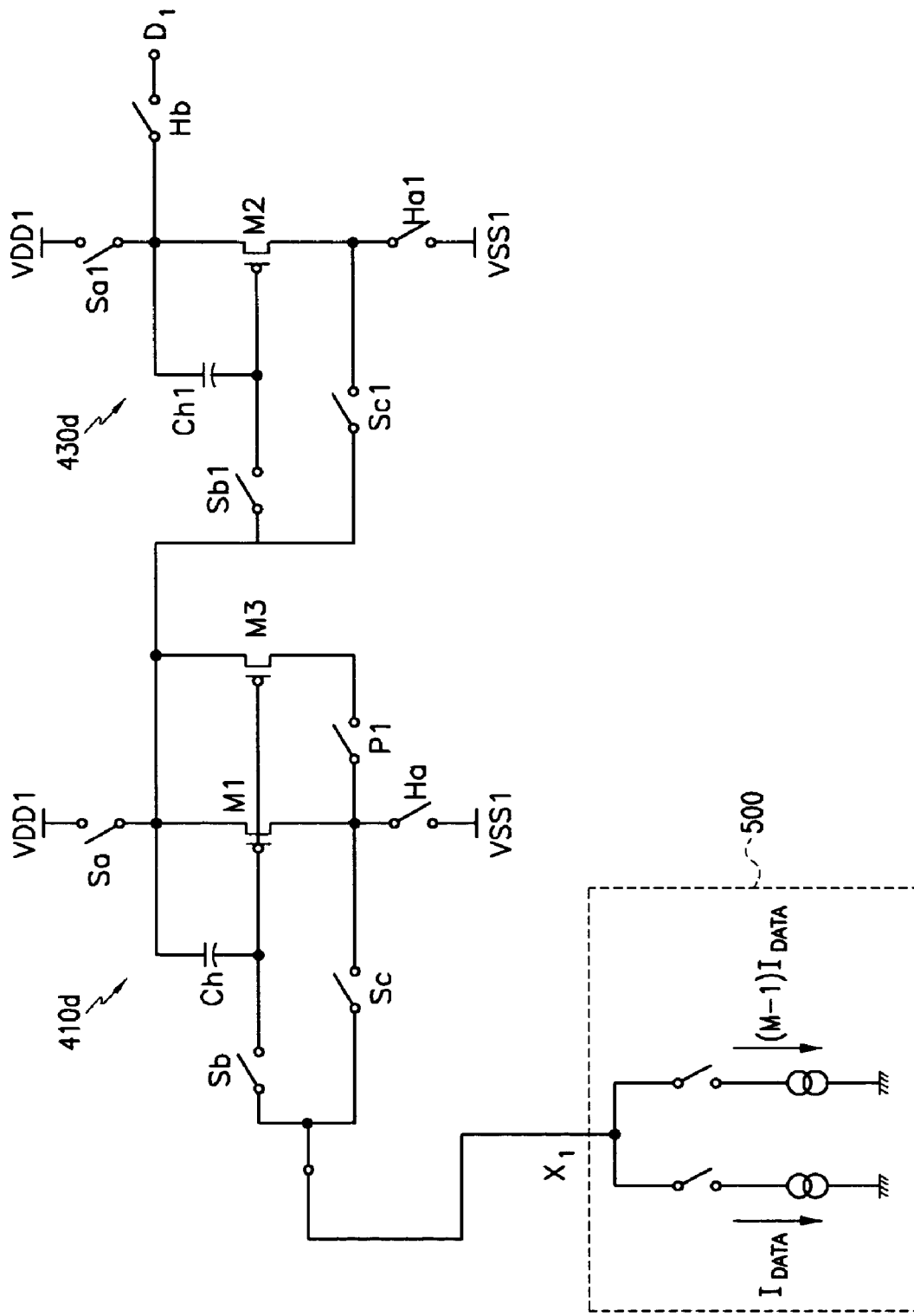
FIG. 18 shows a sample/hold circuit according to a fifth exemplary embodiment of the present invention.

FIG. 18 shows a sample/hold circuit 210d according to a fifth exemplary embodiment of the present invention.

As shown, the sample/hold circuit unit in the demultiplexer according to the fifth embodiment further includes sample/hold circuits 410d, 430d where sample/hold circuit 410d includes a precharge unit as opposed to the sample/hold circuit 410b of FIG. 14. In detail, the precharge unit includes transistor M3 and precharge switch P1 as described with reference to FIG. 15. The source and gate of transistor M3 is coupled to the source and gate of transistor M1, respectively, and switch P1 is coupled between the drain of transistor M1 and the drain of transistor M3. The ratio W3/L3 of channel width W3 to channel length L3 of transistor M3 is (M−1) times the ratio W1/L1 of channel width W1 to channel length L1 of transistor M1.

As described, the precharge unit transmits precharge current $MI_{DATA}$ corresponding to M (where M is a real number greater than 1) times data current $I_{DATA}$ to signal lines $X_1$ to $X_{n/N}$ before data driver 500 transmits the data current to demultiplexer unit 400. Also, data driver 500 generates an additional current $(M−1)I_{DATA}$ for generating precharge current $MI_{DATA}$ together with data current $I_{DATA}$.

Figure 19:
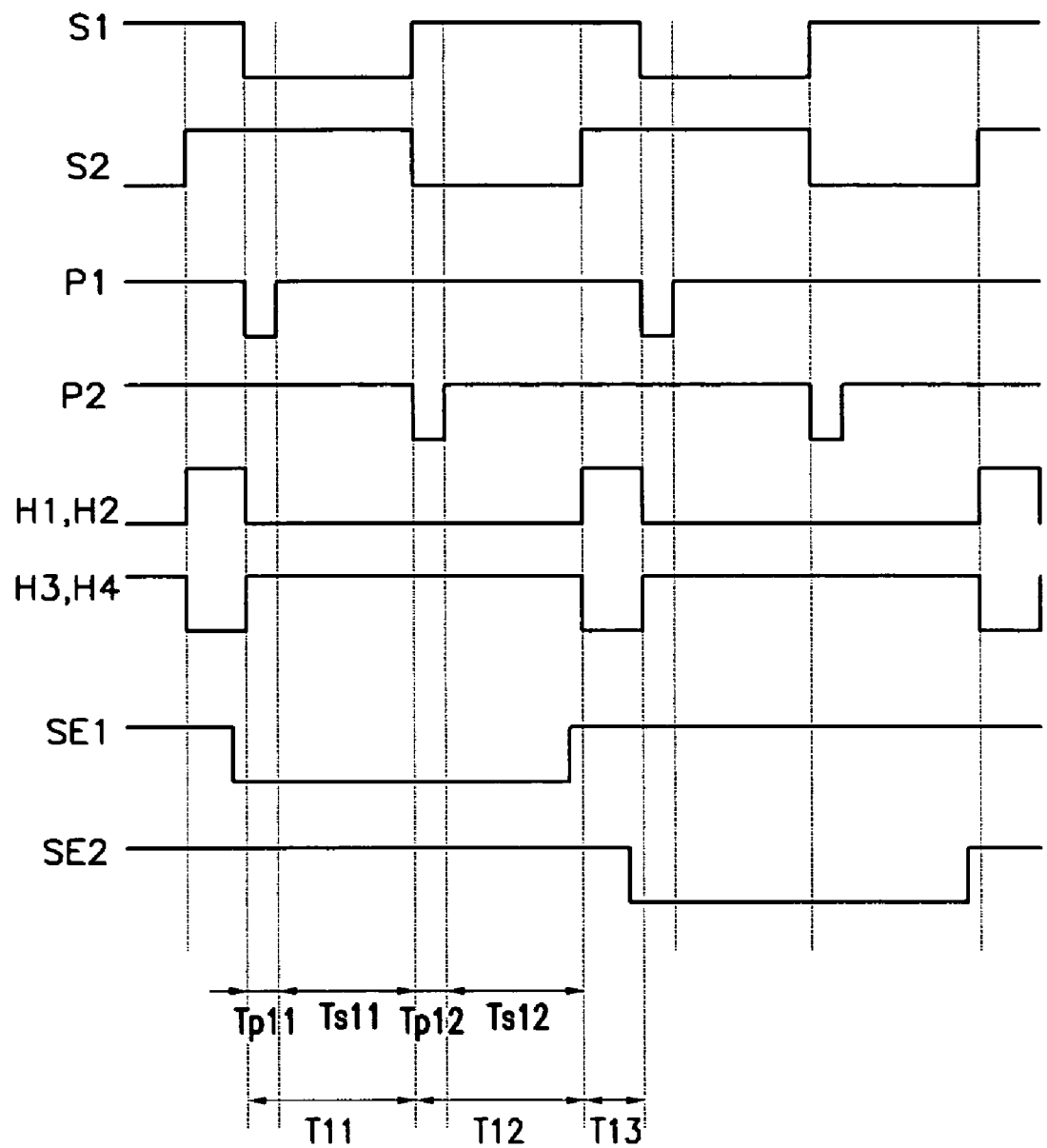
FIG. 19 shows a driving timing diagram for a precharge method according to a fifth exemplary embodiment of the present invention.
Figure 20A:
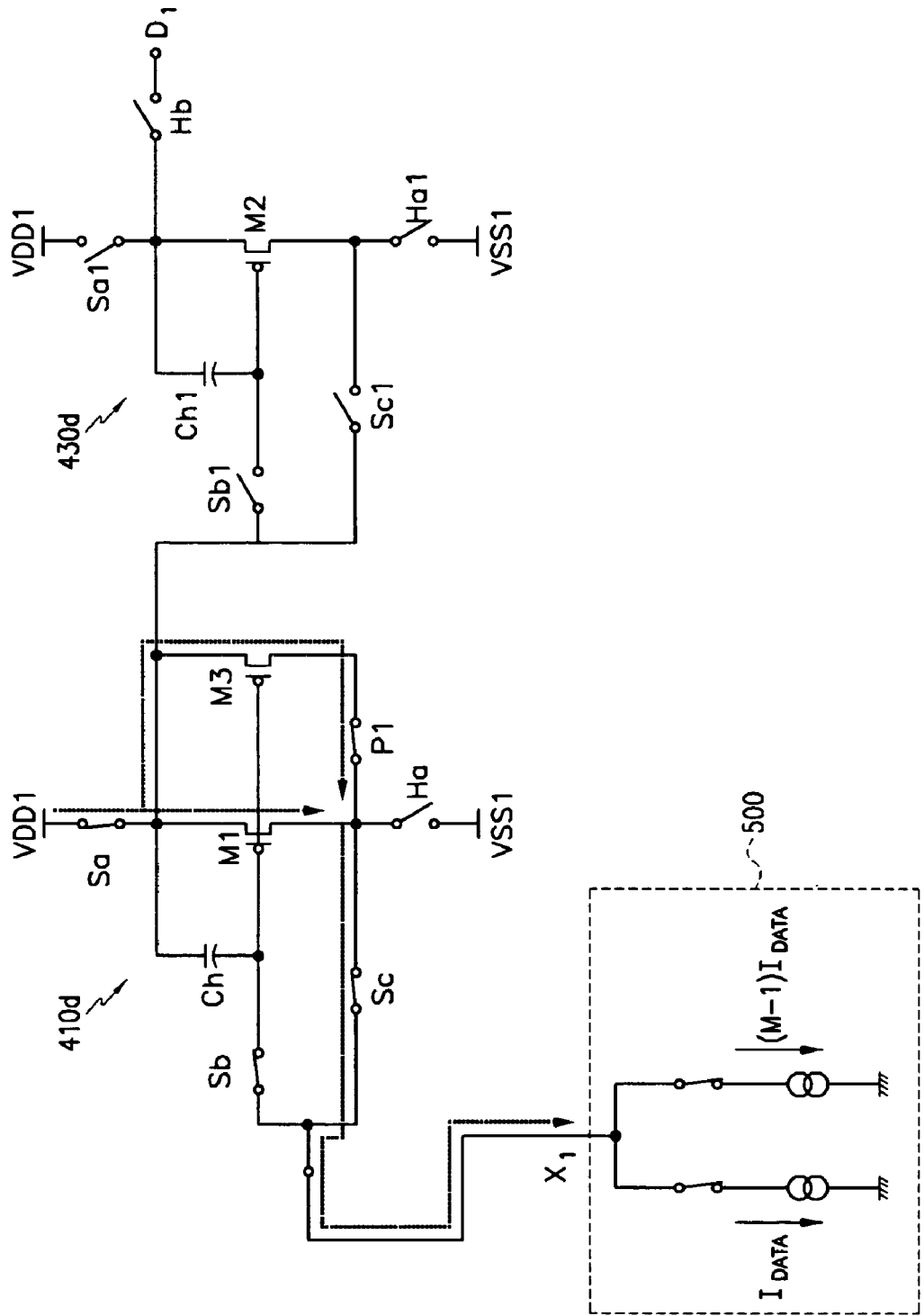

Referring to FIGS. 19, 20A, and 20B, an operation of the sample/hold circuit unit including sample/hold circuits 410d, 430d will be described.

FIG. 19 shows a driving timing diagram for a precharge method according to the fifth exemplary embodiment of the present invention, and FIGS. 20A and 20B respectively show a precharge method according to the fifth exemplary embodiment of the present invention.

Referring to FIGS. 19 and 20A, switches Sa, Sb, Sc (similar to sampling switch S1 of FIG. 12) and precharge switch P1 are turned on, and transistors M1, M3 are respectively diode-connected during precharge period Tp11. Data current $I_{DATA}$ and additional current $(M−1)I_{DATA}$ are concurrently applied to signal line $X_1$ from data driver 500. Since the ratio W3/L3 of the channel width to the channel length of transistor M3 is (M−1) times the ratio W1/L1 of the channel width and the channel length of transistor M1, current $(M-1)I_{DATA}$ is transmitted to the drain of transistor M3, and current $I_{DATA}$ is transmitted to the drain of transistor M1. As a result, signal line $X_1$ is charged with a voltage which is close to a voltage corresponding to data current $I_{DATA}$.

Referring to FIGS. 19 and 20B, additional current $(M-1)I_{DATA}$ is intercepted from data driver 500 and precharge switch P1 is concurrently turned off during sampling period Ts11. Data current $I_{DATA}$ provided from signal line $X_1$ is transmitted to the drain of transistor M1, and capacitor Ch is charged with the voltage corresponding to data current $I_{DATA}$. No subsequent operation description will be provided since it corresponds to that of the third embodiment.

The precharge operation has been described above by exemplifying one sample/hold circuit unit. The precharge operation may be performed before the sampling operation when sample/hold circuits such as sample/hold circuits 410b, 420b of FIG. 12 sequentially perform the sampling operation in the demultiplexer 401. That is, as shown in FIG. 19, periods T11 and T12 may be divided into precharge periods Tp11, Tp12, and sampling periods Ts11, Ts12. Elements P1, P2 in FIG. 19 respectively show precharge switches of precharge unit formed in sample/hold circuits such as sample/hold circuits 410b, 420b of FIG. 12. As a result, data current $I_{DATA}$ is sampled within a quick time since signal line $X_1$ is precharged with a voltage which is close to a voltage corresponding to data current $I_{DATA}$ before respective sample/hold circuits such as sample/hold circuits 410a, 420b sample data current $I_{DATA}$.

Figure 21:
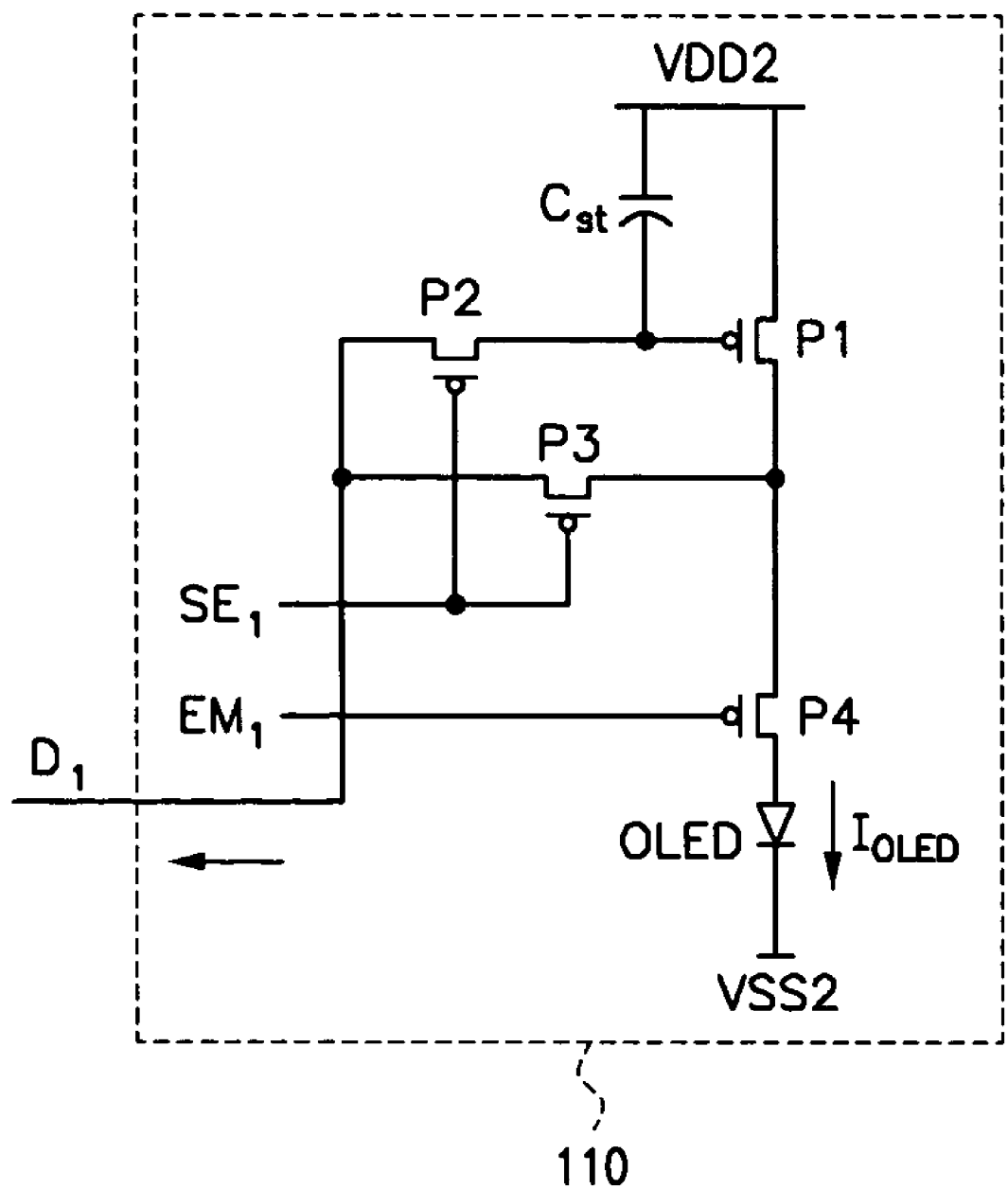
FIG. 21 shows a simplified circuit diagram of a pixel circuit.

Referring to FIG. 21, a pixel circuit formed at the pixel area of the display device according to the first to fifth embodiments will be described. FIG. 21 shows a simplified circuit diagram of the pixel circuit.

As shown, pixel circuit 110 is coupled to data line D1, and the data is programmed to pixel circuit 110 by the current. According to one embodiment, pixel circuit 110 uses an electroluminescent light emission of organic matter. Pixel circuit 110 includes four transistors P1, P2, P3, P4, capacitor Cst, and light emitting element OLED which may be an organic light emitting diode. Transistors P1, P2, P3, P4 are illustrated to be p-channel FETS in FIG. 21.

The source of transistor P1 is coupled to power supply voltage VDD2, and capacitor Cst is coupled between the source and the gate of transistor P1. Transistor P2 is coupled between data line $D_1$ and the gate of transistor P1 and responds to a select signal provided from select scan line $SE_1$. Transistor P3 is coupled between the drain of the transistor P1 and data line $D_1$, and diode-connects transistors P1 and P2 in response to the select signal provided from select scan line $SE_1$. Transistor P4 is coupled between the drain of transistor P1 and light emitting element OLED, and transmits the current provided from transistor P1 to light emitting element OLED in response to an emit signal provided from emit scan line $EM_1$. A cathode of light emitting element OLED is coupled to power supply voltage VSS2 which is less than power supply voltage VDD2.

In this instance, when transistors P2 and P3 are turned on by the select signal provided from select scan line $SE_1$, the current provided from data line $D_1$ flows to the drain of transistor P1, and the source-gate voltage of transistor P1 corresponding to the current is stored in capacitor Cst. When an emit signal is applied from emit scan line $EM_1$, transistor P4 is turned on, and current $I_{OLED}$ of transistor P1 corresponding to the voltage stored in capacitor Cst is supplied to light emitting element OLED, and hence, light emitting element OLED emits light.

The voltage drop in vertical line $V_1$ is reduced since power supply voltage VDD2 is supplied by vertical line $V_1$ in the pixel circuit, and power lines 600, 700 for transmitting voltages to vertical line $V_1$ are formed on the top and the bottom of the display area.

The demultiplexer has been described to perform 1:2 demultiplexing, and without being restricted to this, it can be applied to demultiplexer units for performing 1:N demultiplexing. Also, power supply voltage VDD1 of the sample/hold circuits has been described to be supplied from vertical lines $V_1$ to $V_n$ coupled to power line 700. However, power supply voltage VDD1 may be supplied from lines other than vertical lines $V_1$ to $V_n$ coupled to power line 700. Further, the driving method described in the fourth and fifth embodiments may be applied to the case in which power line 700 is not coupled to vertical lines $V_1$ to $V_n$.

According to the present invention, the voltage drop generated in the vertical lines is reduced by additionally providing a power line for supplying a power supply voltage in the display device using a demultiplexer, and the data current is sampled within the given time by precharging the signal line provided between the demultiplexer and the data driver.

While this invention has been described in connection with what is presently considered to be the practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
   a display area including a plurality of data lines for transmitting data current for displaying an image, and a plurality of pixel circuits coupled to the data lines;
   a plurality of first signal lines;
   a data driver coupled to the first signal lines for time-dividing a first current corresponding to the data current, and transmitting the time-divided first current to the first signal lines; and
   a demultiplexer unit including a plurality of demultiplexers for respectively receiving the first current from the first signal lines, and a precharge unit coupled to at least one of the demultiplexers for transmitting a precharge current having a magnitude that varies according to a magnitude of the first current to the first signal lines in response to a control signal,
   wherein said at least one of the demultiplexers receives the first current from the first signal lines and transmits the data current to at least two data lines, and the precharge current is transmitted to the first signal lines before the data driver transmits the first current corresponding to one of the data lines,
   wherein said at least one of the demultiplexers includes a plurality of sample/hold circuits coupled to the first signal lines, the sample/hold circuits of a first group sequentially sampling the first current sequentially applied through the first signal lines and the sample/hold circuits of a second group holding sampled current to at least two data lines during a first portion of a horizontal period, and the sample/hold circuits of the first group holding current and the sample/hold circuits of the second group sampling the current held by the sample/hold circuits of the first group during a second portion of the horizontal period, and wherein the second portion is shorter than the first portion.

2. The display device of claim 1, wherein the sample/hold circuits of the first group hold current sampled during a previous horizontal period to at least two data lines and sample/hold circuits of the second group sequentially sample the first current sequentially applied through the first signal lines during a particular horizontal period.

3. The display device of claim 2, wherein the sample/hold circuits include:
first and second sample/hold circuits having input terminals coupled to one of the first signal lines and output terminals coupled to a first data line of the at least two data lines; and
third and fourth sample/hold circuits having input terminals coupled to the one of the first signal lines and output terminals coupled to a second data line of the at least two data lines,
wherein the first and third sample/hold circuits form the first group of sample/hold circuits, and the second and fourth sample/hold circuits form the second group of sample/hold circuits.

4. The display device of claim 2, wherein the sample/hold circuit includes a sampling switch being turned on in response to a sampling signal, a holding switch being turned on in response to a holding signal, and a data storage element for sampling the current applied through the input terminal when the sampling switch is turned on and holding the sampled current when the holding switch is turned on.

5. The display device of claim 4, wherein the data storage element includes:
a first transistor having a source coupled to a first power source and a gate and a drain coupled to the first signal line in response to the sampling signal; and
a capacitor coupled between the gate and the source of the first transistor for storing a voltage corresponding to the current transmitted to the drain.

6. The display device of claim 5, wherein the precharge unit includes at least one precharge circuit coupled to at least one sample/hold circuit having an input terminal coupled to the first signal line, and wherein
the precharge circuit includes a second transistor having a source, a gate, and a drain respectively coupled to the source, the gate, and the drain of the first transistor when the control signal is applied.

7. The display device of claim 6, wherein the sampling signal is applied substantially concurrently with the control signal, and the control signal is intercepted while the sampling signal is applied, and wherein
the precharge current is about M times the first current where M is a real number greater than 1, and wherein
a value obtained from a ratio of (channel width)/(channel length) of the second transistor is about (M−1) times a value obtained from a ratio of (channel width)/(channel length) of the first transistor.

8. The display device of claim 7, wherein the first and second transistors are of equal conductive types.

9. The display device of claim 6, wherein the precharge circuit further includes a switch coupled between the drain of the first transistor and the drain of the second transistor, wherein the precharge circuit is turned on in response to the control signal.

10. The display device of claim 5, wherein the sampling switch includes a first switch coupled between the drain of the first transistor and the input terminal, a second switch for diode-connecting the first transistor when it is turned on, and a third switch coupled between the first power source and the first transistor, and the holding switch includes a fourth switch coupled between a second power source and the first transistor, and a fifth switch coupled between the first transistor and an output terminal.

11. The display device of claim 1, wherein the sample/hold circuits of the first group include first and second sample/hold circuits having input terminals coupled to the first signal lines, and
the sample/hold circuits of the second group include third and fourth sample/hold circuits having input terminals coupled to output terminals of the first and second sample/hold circuits, and having output terminals coupled to first and second data lines of the at least two data lines.

12. The display device of claim 1, wherein the sample/hold circuit includes a sampling switch being turned on in response to a sampling signal, a holding switch being turned on in response to a holding signal, and a data storage element for sampling the current applied through the input terminal when the sampling switch is turned on and holding the sampled current when the holding switch is turned on, and wherein
the holding switches of the sample/hold circuits of the first group and the sampling switches of the sample/hold circuits of the second group are shared.

13. The display device of claim 1, wherein the display area further includes a plurality of second signal lines for supplying a power supply voltage to the plurality of pixel circuits, and wherein
the display device further includes a power line, formed between the demultiplexer unit and the data driver, insulated from the first signal lines and crossing the first signal lines for transmitting the power supply voltage provided from the plurality of second signal lines.

14. The display device of claim 13, wherein a first power source is coupled to the power line.

15. The display device of claim 1, wherein the pixel circuit includes:
a transistor to which the data current transmitted through the data line flows;
a capacitor coupled between a source and a gate of the transistor for storing a voltage corresponding to the current flowing to the transistor; and
a light emitting element for emitting light corresponding to the current flowing to the transistor according to the voltage stored in the capacitor.

16. The display device of claim 15, wherein the light emitting element uses electroluminescent light emission of organic matter.

17. A display device comprising:
a display area including first and second data lines extended in one direction and a plurality of pixel circuits coupled to the first and second data lines;
a first signal line;
a first sample/hold circuit coupled between the first signal line and the first data line for holding a first data current for displaying an image, to the first data line;
a second sample/hold circuit coupled between the first signal line and the second data line for holding a second data current for displaying an image, to the second data line;
a data driver coupled to the first signal line for sequentially transmitting first and second currents respectively corresponding to first and second data currents to the first signal line;

a first precharge circuit coupled to the first sample/hold circuit for transmitting a first precharge current to the first signal line before the first current is applied to the first signal line; and a second precharge circuit coupled to the second sample/hold circuit for transmitting a second precharge current to the first signal line before the second current is applied to the first signal line, wherein the first and second sample/hold circuits respectively sample the first and second currents during one horizontal period and hold the first and second currents during a subsequent horizontal period.

18. The display device of claim 17, wherein the first and second precharge currents are about M times the first and second currents respectively, where M is a real number greater than 1.

19. The display device of claim 18, wherein the first and second sample/hold circuits each include a first transistor and a capacitor coupled between a source and a gate of the first transistor, and wherein the first and second precharge circuits each include a second transistor, and wherein sources, gates, and drains of the first and second transistors are respectively coupled and one of the first and second precharge currents is transmitted to the drains of the first and second transistors when one of the first and second precharge currents is applied to the first signal line, and wherein at least one of the sources, the gates, and the drains of the first and second transistors are decoupled and one of the first and second currents is transmitted to the drain of the first transistor when one of the first and second currents is applied to the first signal line.

20. The display device of claim 17, further comprising:

a third sample/hold circuit coupled between the first signal line and the first data line for holding the first data current to the first data line; and a fourth sample/hold circuit coupled between the first signal line and the second data line for holding the second data current to the second data line, wherein the third and fourth sample/hold circuits respectively sample the first and second currents while the first and second sample/hold circuits hold the first and second currents.

21. A display device comprising:

a display area including first and second data lines extended in one direction and a plurality of pixel circuits coupled to the first and second data lines;

a first signal line;

a first sample/hold circuit having an input terminal coupled to the first signal line;

a second sample/hold circuit having an input terminal coupled to the first signal line;

a third sample/hold circuit, coupled between an output terminal of the first sample/hold circuit and the first data line, for holding a first data current for displaying an image, to the first data line;

a fourth sample/hold circuit, coupled between an output terminal of the second sample/hold circuit and the second data line, for holding a second data current for displaying an image, to the second data line;

a data driver coupled to the first signal line for sequentially transmitting first and second currents respectively corresponding to first and second data currents to the first signal line;

a first precharge circuit coupled to the first sample/hold circuit for transmitting a first precharge current to the first signal line before the first current is applied to the first signal line; and a second precharge circuit coupled to the second sample/hold circuit for transmitting a second precharge current to the first signal line before the second current is applied to the first signal line, wherein the first and second sample/hold circuits respectively sample the first and second currents during a first portion of a horizontal period and hold the sampled currents during a second portion of the horizontal period, and the third and fourth sample/hold circuits sample the currents held by the first and second sample/hold circuits during the second portion and hold the first and second data currents during the first portion.

22. The display device of claim 21, wherein the first and second precharge currents are about M times the first and second currents respectively, where M is a real number greater than 1.

23. The display device of claim 22, wherein the first and second sample/hold circuits each include a first transistor and a capacitor coupled between a source and a gate of the first transistor, the first and second precharge circuits each include a second transistor, sources, gates, and drains of the first and second transistors are respectively coupled and one of the first and second precharge currents is transmitted to the drains of the first and second transistors when one of the first and second precharge currents is applied to the first signal line, and at least one of the sources, the gates, and the drains of the first and second transistors are decoupled and one of the first and second currents is transmitted to the drain of the first transistor when one of the first and second currents is applied to the first signal line.

24. A display device including a plurality of data lines for transmitting data currents for displaying images, a plurality of pixel circuits coupled to the data lines for displaying the images according to the data currents, and a plurality of first signal lines corresponding to at least two data lines from among the data lines and sequentially transmitting currents corresponding to the data currents, comprising:

a data driver for time-dividing the currents corresponding to at least two data lines and applying them to the first signal lines;

a first sample/hold circuit for sampling a first current corresponding to one of data lines that is time-divided and applied through the first signal lines, the first sample/hold circuit including a first transistor and a capacitor coupled to a source and a gate of the first transistor; and a precharge circuit coupled to the first sample/hold circuit, the precharge circuit including a second transistor and configured to provide a precharge current having a magnitude that varies according to a magnitude of the first current, wherein the first current is applied to the first signal line while at least one of sources, gates, and drains of the first and second transistors are decoupled, after the precharge current is applied to the first signal line while the sources, the gates, and the drains of the first and second transistors are coupled, wherein the precharge current is about M times the first current, and a value obtained from a ratio of (channel width)/(channel length) of the second transistor is about (M−1) times a value obtained from a ratio of (channel width)/(channel length) of the first transistor.

25. The display device of claim 24, wherein the first sample/hold circuit holds the sampled first current to the data line.

26. The display device of claim 24, further comprising a second sample/hold circuit coupled between an output terminal of the first sample/hold circuit and the data line, wherein the first sample/hold circuit holds the sampled first current to an input terminal of the second sample/hold circuit, and the second sample/hold circuit samples the current held by the first sample/hold circuit and holds it to the data line.

* * * * *

UNITED STATES PATENT AND TRADEMARK OFFICE
CERTIFICATE OF CORRECTION

| | | |
|---|---|---|
| PATENT NO. | : 7,738,512 B2 | Page 1 of 1 |
| APPLICATION NO. | : 10/990659 | |
| DATED | : June 15, 2010 | |
| INVENTOR(S) | : Dong-Yong Shin et al. | |

It is certified that error appears in the above-identified patent and that said Letters Patent is hereby corrected as shown below:

Column 22, Claim 24, line 48          After "of" Insert -- the --

Signed and Sealed this
Thirteenth Day of December, 2011

David J. Kappos
*Director of the United States Patent and Trademark Office*